US010611638B2

(12) United States Patent
Adam et al.

(10) Patent No.: US 10,611,638 B2
(45) Date of Patent: Apr. 7, 2020

(54) PROCESS FOR MANUFACTURING A METAL CARBIDE, NITRIDE, BORIDE, OR SILICIDE IN POWDER FORM

(71) Applicant: HÖGANÄS AB (PUBL), Höganäs (SE)

(72) Inventors: Gorgees Adam, El Cajon, CA (US); Hilmar Vidarsson, Munka Ljungby (SE)

(73) Assignee: HÖGANÄS AB (PUBL), Höganäs (SE)

( * ) Notice: Subject to any disclaimer, the term of this patent is extended or adjusted under 35 U.S.C. 154(b) by 411 days.

(21) Appl. No.: 15/126,427

(22) PCT Filed: Mar. 20, 2015

(86) PCT No.: PCT/EP2015/056005
§ 371 (c)(1),
(2) Date: Sep. 15, 2016

(87) PCT Pub. No.: WO2015/140328
PCT Pub. Date: Sep. 24, 2015

(65) Prior Publication Data
US 2017/0081196 A1      Mar. 23, 2017

(30) Foreign Application Priority Data

Mar. 21, 2014 (GB) .................................. 1405114.8

(51) Int. Cl.
*C01B 21/06* (2006.01)
*C01B 21/076* (2006.01)
(Continued)

(52) U.S. Cl.
CPC ...... *C01B 21/0617* (2013.01); *C01B 21/0761* (2013.01); *C01B 32/914* (2017.08);
(Continued)

(58) Field of Classification Search
None
See application file for complete search history.

(56) References Cited

U.S. PATENT DOCUMENTS 2,411,524 A    11/1946 Davis et al.
3,140,170 A    7/1964 Henrie et al.
(Continued)

FOREIGN PATENT DOCUMENTS

CH    496 099 A    9/1970
CN    1226881 A    8/1999
(Continued)

OTHER PUBLICATIONS

Machine generated translation of CN101186300, pp. 1-7, patent published May 2008.*

(Continued)

*Primary Examiner* — Colleen P Dunn
(74) *Attorney, Agent, or Firm* — Buchanan Ingersoll & Rooney P.C.

(57) ABSTRACT

A process for manufacturing a compound in powder form, wherein said compound is the reaction product of (i) at least one metal and/or metalloid, and (ii) at least one further element that is more electronegative than the metal and/or metalloid, which process includes steps of: mixing at least one oxide of said at least one metal and/or metalloid with a reducing agent including Ca or Mg granules or powder, and/or calcium hydride or magnesium hydride in granule or powder form, to form a mixture; exposing the mixture to a source of said at least one further element; maintaining said mixture under a $H_2$ atmosphere at a temperature of from 950° C. to 1500° C. for 1-10 hours; and, recovering said compound in powder form; wherein said at least one further
(Continued)

element is selected from carbon, nitrogen, boron, silicon and mixtures thereof. A compound in powder form obtainable by such a process.

15 Claims, 22 Drawing Sheets

(51) Int. Cl.
*C01B 32/956* (2017.01)
*C01B 32/921* (2017.01)
*C01B 35/04* (2006.01)
*C01B 32/914* (2017.01)
*C01B 33/06* (2006.01)
*C01B 32/949* (2017.01)

(52) U.S. Cl.
CPC .......... *C01B 32/921* (2017.08); *C01B 32/949* (2017.08); *C01B 32/956* (2017.08); *C01B 33/06* (2013.01); *C01B 35/04* (2013.01); *C01P 2002/54* (2013.01); *C01P 2002/70* (2013.01); *C01P 2002/72* (2013.01); *C01P 2002/85* (2013.01); *C01P 2004/03* (2013.01); *C01P 2004/51* (2013.01); *C01P 2004/61* (2013.01)

(56) References Cited

U.S. PATENT DOCUMENTS

| | | | | |
|---|---|---|---|---|
| 3,328,129 | A | * | 6/1967 | Muta ..................... C01B 32/956 423/291 |
| 3,486,881 | A | * | 12/1969 | Meadows ............. C22C 1/1068 419/18 |
| 3,520,656 | A | * | 7/1970 | Yates .................... C04B 35/575 423/345 |
| 3,692,479 | A | * | 9/1972 | Meadows ........... C04B 35/5607 423/440 |
| 4,590,053 | A | * | 5/1986 | Hashimoto ......... C01B 21/0685 423/344 |
| 5,044,613 | A | | 9/1991 | Kumar et al. |
| 5,746,803 | A | | 5/1998 | Dunmead et al. |
| 6,171,363 | B1 | | 1/2001 | Shekhter et al. |
| 6,264,719 | B1 | | 7/2001 | Zhang et al. |
| 6,398,980 | B1 | | 6/2002 | Reutova et al. |
| 6,558,447 | B1 | | 5/2003 | Shekhter et al. |
| 8,328,899 | B2 | | 12/2012 | Adam et al. |
| 2009/0053132 | A1 | | 2/2009 | Shi et al. |
| 2010/0108941 | A1 | | 5/2010 | Sugunobe et al. |
| 2010/0313709 | A1 | | 12/2010 | Ikarashi et al. |

FOREIGN PATENT DOCUMENTS

| | | | |
|---|---|---|---|
| CN | 1246102 | A | 3/2000 |
| CN | 1251545 | A | 4/2000 |
| CN | 1919508 | A | 2/2007 |
| CN | 101186300 | * | 5/2008 |
| CN | 101186300 | A | 5/2008 |
| CN | 101254896 | A | 9/2008 |
| CN | 101254897 | A | 9/2008 |
| CN | 101254898 | A | 9/2008 |
| CN | 102616780 | A | 8/2012 |
| CN | 103318855 | A | 9/2013 |
| GB | 485163 | A | 5/1938 |
| GB | 624458 | A | 6/1949 |
| GB | 1023292 | | 3/1966 |
| GB | 1318965 | A | 5/1973 |
| JP | 61-287105 | A | 12/1986 |
| JP | 1-168827 | A | 7/1989 |
| JP | 3-159910 | A | 7/1991 |
| JP | 5-299216 | A | 11/1993 |
| JP | 2010-059047 | A | 3/2010 |
| RU | 2200128 | C2 | 3/2003 |
| RU | 2417949 | C1 | 5/2011 |
| SU | 556110 | A1 | 4/1977 |
| WO | 9843763 | A1 | 10/1998 |
| WO | WO 2008/010733 | A1 | 1/2008 |

OTHER PUBLICATIONS

Search Report dated Mar. 20, 2018, by the Chines Patent office in Chinese Application No. 2015800256557, (1 page).
International Search Report (PCT/ISA/210) dated Jul. 3, 2015, by the European Patent Office as the International Searching Authority for International Application No. PCT/EP2015/056005.
Written Opinion (PCT/ISA/237) dated Jul. 3, 2015, by the European Patent Office as the International Searching Authority for International Application No. PCT/EP2015/056005.
United Kingdom Search Report dated Nov. 22, 2013 for Application No. GB1309173.1.
United Kingdom Search Report dated Sep. 24, 2014 for Application No. GB1405114.8.
International Search Report (PCT/ISA/210) dated Jul. 23, 2014, by the European Patent Office as the International Searching Authority for International Application No. PCT/EP2014/060462.
Written Opinion (PCT/ISA/237) dated Jul. 23, 2014, by the European Patent Office as the International Searching Authority for International Application No. PCT/EP2014/060462.
*ASM Metals Handbook, Volume 7: Powder Metallurgy*, $9^{th}$ Edition, 1984, pp. 216-218, American Society for Metals, Metals Park, Ohio 44073, ISBN 0-87170-013-1.
Search Report dated Oct. 5, 2018, by the Gorodissky, Federal Institute of Industrial Property (FIIP) in corresponding Application No. 2016141261/05(065989), 2 pages, English translation only.

* cited by examiner

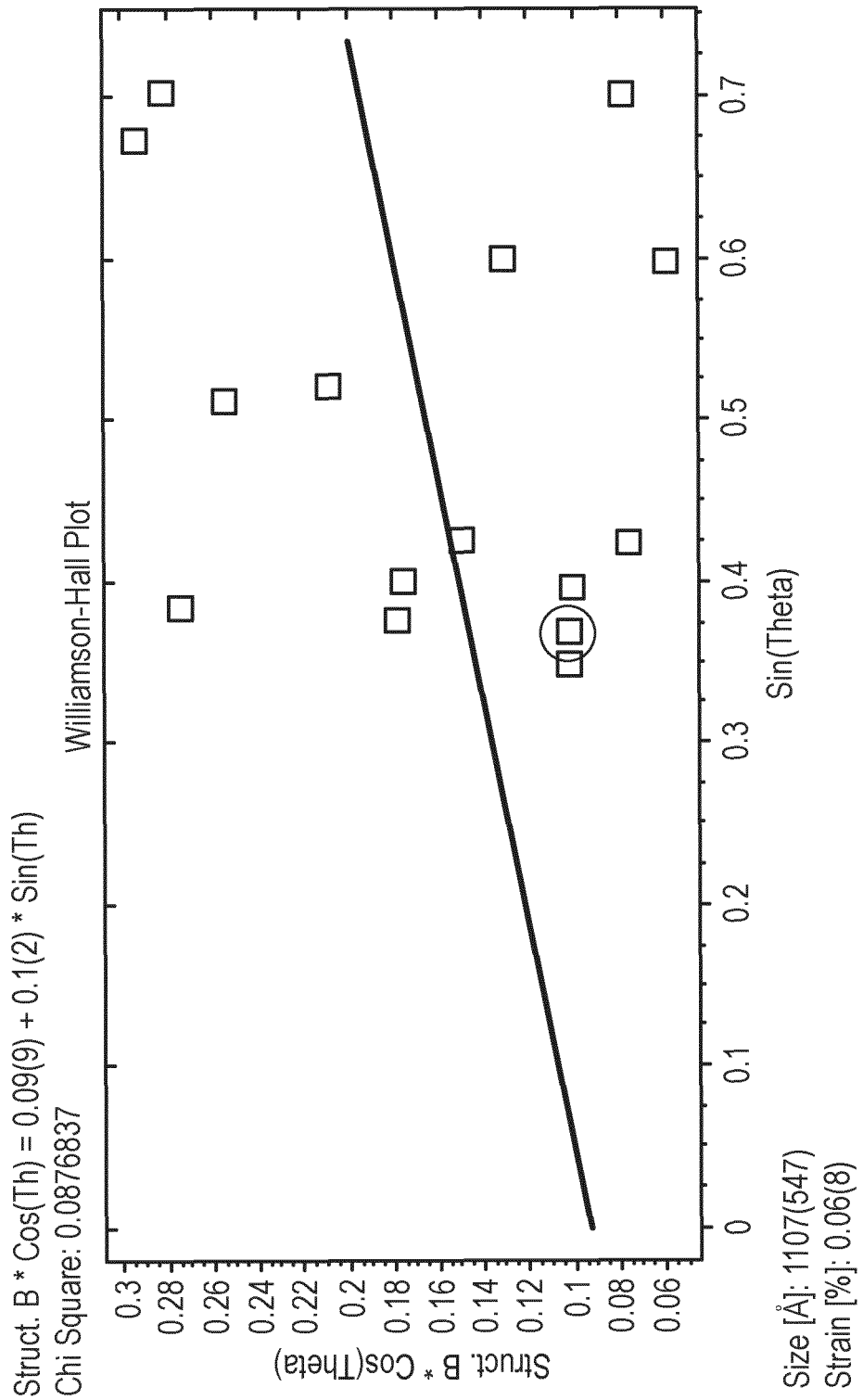

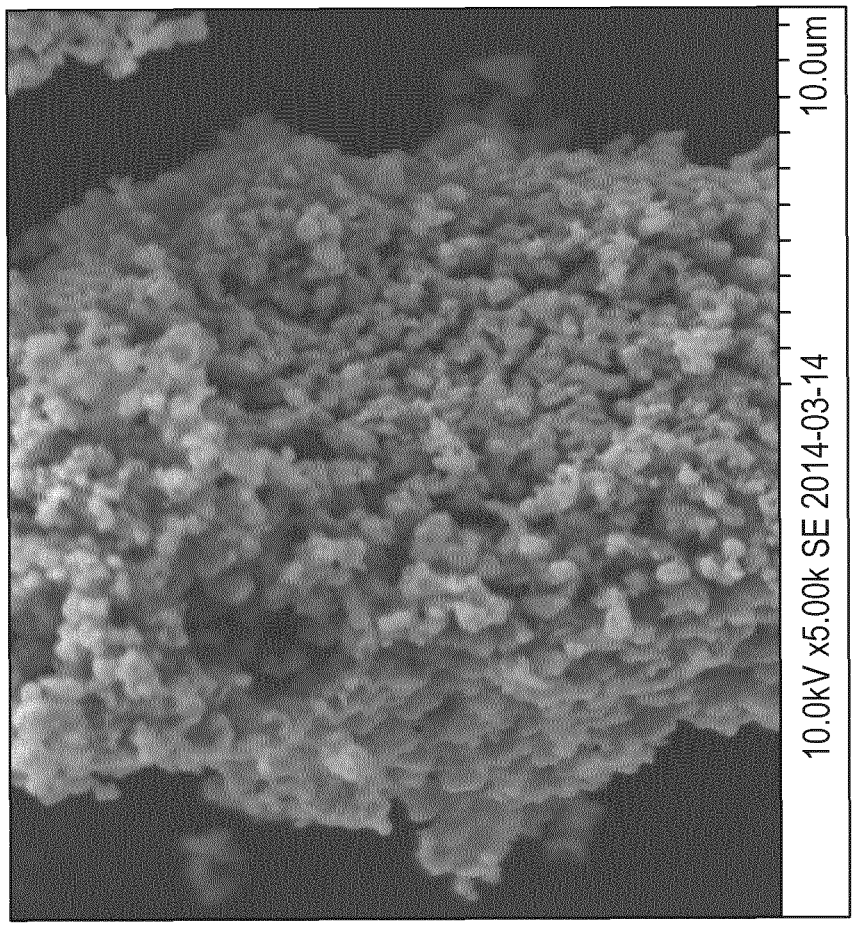
Fig. 13B
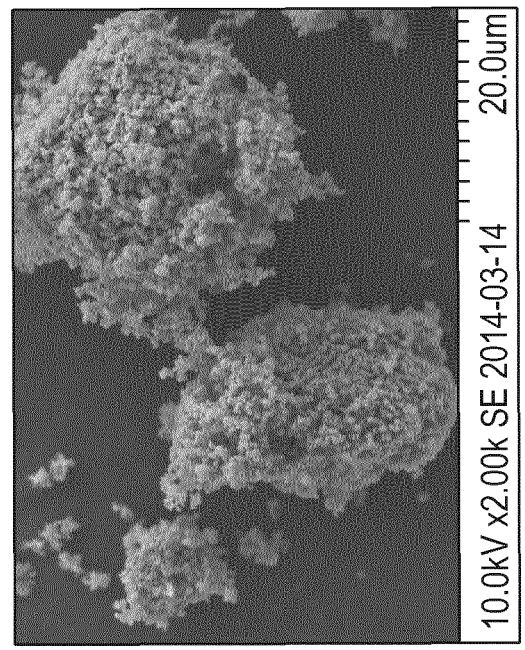

PROCESS FOR MANUFACTURING A METAL CARBIDE, NITRIDE, BORIDE, OR SILICIDE IN POWDER FORM

FIELD OF THE INVENTION

The present invention concerns a new process for producing hard phase powders, in particular metal carbides, nitrides, borides and silicides.

BACKGROUND OF THE INVENTION

Powder metallurgical (PM) techniques are well established routes for efficient production of complex metal based components. These techniques are commonly used in applications where alloys based on iron, stainless steel, copper or nickel are required. However, the use of PM techniques where material such as titanium, chromium, niobium and tantalum are required has so far been limited.

One issue that arises with the mass production of metal containing powders is the presence of impurities, which can be difficult to avoid. Thus, U.S. Pat. No. 3,140,170 describes an approach in which the object was to provide a process for reduction of titanium oxides to give a product low in oxygen and alloyed magnesium (derived from the magnesium reducing agent). The described approach involves reducing titanium oxides with magnesium metal in the presence of a magnesium dichloride flux and in an atmosphere of hydrogen. This approach is said to enable an oxygen content as low as 2.23 percent. This still represents a significant content of oxygen impurities, though—indeed, the product is described as "impure titanium metal" and is intended for use as a starting material for electro-refining, which is then needed to prepare "high purity" titanium.

More recent publications concerning metal powder preparation include JPH05299216, which concerns the preparation of a rare earth-based alloy magnetic material. In this approach a rare earth oxide, reducing agent and a metal are mixed, a reduction-diffusion reaction treatment is conducted in a hydrogen-containing atmosphere, and the obtained cake-like reaction product is then cooled, with the atmosphere being switched to an inert gas at 770 to 870° C. Another publication is JPH01168827, which describes a method of preparing chromium powder. The method involves mixing chromium oxide with calcium hydride and then heating under hydrogen. A further publication is US 2009/0053132, which describes the preparation of niobium (or niobium suboxide) powder. This approach involves mixing niobium oxides with a reducing agent, reacting the components at a temperature of 600 to 1300° C. in a vacuum or under inert or hydrogen gas, leaching, and then heating (a second time) to a temperature of 1000 to 1600° C.

The above-mentioned publications generally concern the preparation of metal powders. However, a further class of important product is metal containing products such as metal (or metalloid) carbides, nitrides, borides and silicides. Metal (or metalloid) carbides, nitrides, borides and silicides are required for a variety of industrial purposes. Such compounds should desirably be produced by a process which yields the product as a high quality powder. Thus, for example, processes involving strong exothermic reactions can lead to a degraded product due to uncontrolled sintering. Further, a strong exothermic reaction can reduce the efficacy of the process and require an expensive reactor vessel to contain the reaction.

Typical approaches for the mass preparation of products containing a metal (or metalloid) carbide, nitride, boride or silicide involve first preparing a metal product and then carrying out a further step of reacting that metal with a suitable source of carbon, nitrogen, boron or silicon. However, even if a relatively pure starting material is used, it can be difficult to produce a high quality carbide, nitride, boride or silicide product on an industrial scale. Previously described approaches for preparing metal carbides and nitrides include the following.

JPH03159910 describes an approach of milling transition metal powder and carbon powder without heating. Exothermic reaction produces transition metal carbide.

JP 2010059047 describes approximately spherical particles containing a rare earth nitride for use as a magnetic refrigeration material. The particles are prepared by nitriding spherical particles of the rare earth element (e.g. yttrium or scandium).

CN 102616780 discusses some of the difficulties that can arise when preparing products such as titanium carbide, noting that if direct carbonation is carried out by combining powders of titanium and carbon, the reaction is very fast and difficult to control. Against that background, CN 102616780 describes an approach involving the use a direct current (DC) arc method for preparing titanium carbide nanometer particles. This involves using automatically controlled DC arc plasma equipment, wherein a gaseous mixture containing a carbonic reaction gas, an inert gas and an active gas are introduced in the presence of a titanium anode and a graphite cathode.

More recently, CN 103318855 discusses the preparation of chromium nitride. In this regard, a previous approach of using microwave heating to prepare products of this type is noted, but is said to entail difficulty in removing amorphous carbon residue which persists in the product. It is also noted that a previous approach involving an arc discharge plasma method did not lend itself well to mass production, due to high energy consumption and low production capacity. It is further noted that the usual approaches for effecting nitridation of chromium involve subjecting various chromium materials to an ammonia atmosphere, but that these suffer drawbacks (the production of harmful gases and corrosion of equipment) and lead to a low purity product with a high oxygen content. The document then goes on to describe the preparation of chromium nitride by subjecting high purity chromium powder to flowing ammonia at a temperature of 800 to 1200° C. Even then, though, the oxygen contents in the exemplified chromium nitride products are reported to be 2.38% and 1.63%.

Another reference, namely CN101186300, concerns an approach for preparing a titanium silicide product using microwave radiation. The approach involves (a) selecting a reacting substance system containing titanium and silicon, (b) adding doping materials into that system, (c) mixing and ball milling until the particle size is 5 nm-0.5 mm, (d) putting the mixture into a crucible pot and subjecting it to microwave radiation for 0.1 to 10 hours at 100 to 1500° C. in the presence of a protective gas, and (e) washing, filtering and drying to obtain a doped titanium silicide product. One particular product made from titanium powder, silicon powder and urea is described—after pressing, a mixture of these components is heated under Argon at 900° C. for one hour, prior to washing, filtering and drying. A second product made from powders of titanium dioxide, magnesium and silicon is described too—a mixture of these components is heated to 800° C. under Argon for 0.5 hours. As discussed above, though, it is known from CN 103318855 that this approach of using microwaves can lead to amorphous carbon residue in the product, which can be difficult to remove.

The present invention relates to an improved and cost effective production of metal (or metalloid) carbides, nitrides, borides and silicides, whereby these products can be obtained efficiently as high quality powders, directly from a corresponding oxide of the metal (or metalloid). The approach of the present invention also lends itself particularly well to mass production on an industrial scale.

SUMMARY OF THE INVENTION

The present invention is based on the finding that it is possible to reduce oxides of metals and/or metalloids under hydrogen atmosphere very effectively, using certain specific reducing agents and certain specific temperatures, to obtain pure metals, metalloids or alloys thereof, and further that these metals can be converted directly to carbides, nitrides, borides, silicides, or combinations thereof, by introducing a source of carbon, nitrogen, boron and/or silicon. The end products are of a very high purity. In particular, the process of the invention can yield products in the form of powders having nanosized particles.

The present invention therefore provides a process for manufacturing a compound in powder form, wherein said compound is the reaction product of (i) at least one metal and/or metalloid, and (ii) at least one further element that is more electronegative than the or each said metal and/or metalloid, which process comprises the steps of:
  a. mixing at least one oxide of said at least one metal and/or metalloid with a reducing agent to form a mixture, wherein the reducing agent comprises Ca, Mg, calcium hydride, magnesium hydride or a mixture thereof and is provided in the form of granules or a powder;
  b. contacting the mixture with a source of said at least one further element;
  c. maintaining said mixture under a $H_2$ atmosphere at a temperature of from 950° C. to 1500° C. from 1 to 10 hours; and
  d. recovering said compound in powder form;
wherein said at least one further element is selected from carbon, nitrogen, boron, silicon and mixtures thereof.

The present invention also provides a compound in powder form obtainable by the process set out above.

BRIEF DESCRIPTION OF THE DRAWINGS

FIGS. 11A and 11B depict the XRD pattern of the TiN powder.

FIGS. 13A, 13B and 13C depict SEM micrographs of titanium carbide powder.

DETAILED DESCRIPTION

Figure 1:
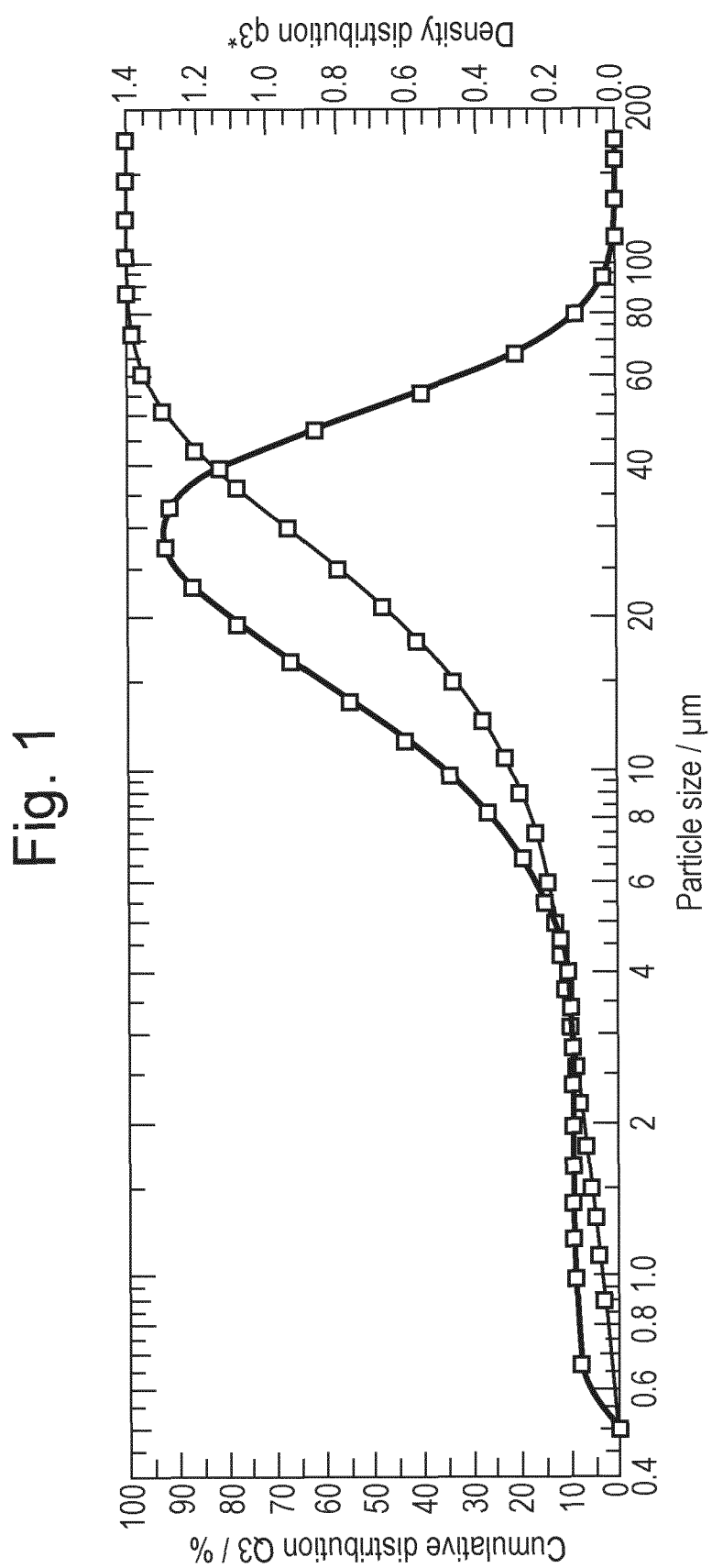
FIG. 1 depicts a Sympatec curve showing the particle size distribution of the $Nb_2O_5$ powder used for making the niobium carbide powder.

As starting materials, at least one oxide of at least one metal and/or metalloid, typically in powder form, is mixed with a reducing agent, such as calcium or magnesium, in powder form or in the form of granules.

Typically, the metal/metalloid oxide used as starting material is provided in the form of a powder. The powder mixture used as starting material should preferably not be compacted. The mixture is heated to a temperature in the range of 950° C. to 1500° C., and kept under a $H_2$ atmosphere for 1-10 hours, which should generally cover the duration of the reduction reaction.

The powder mixture used as a starting material may further contain a source of said at least one further element to directly convert the formed metal(s) and/or metalloid(s) into the desired compound in powder form. Alternatively, the source of said at least one further element can be supplied by introducing one or more gaseous species containing said element(s) into the atmosphere during or after the reduction of said at least one oxide, before subjecting the reaction mixture to cooling. This results in the formation of the desired compound in powder form.

The metals for use in the present invention are preferably transition metals, more preferably group IIIB, IVB, VB or VIB transition metals. Most preferably they are selected from Sc, Ti, V, Cr, Y, Zr, Nb, Mo, Hf, Ta and W. Particularly preferred are Nb, Ti, Cr, W and Ta. As regards possible mixtures of metals, a preferred example is W and Ta.

The metalloids for use in the present invention are preferably group IIIA or IVA metalloids. More preferred are B and Si.

Thus, preferably said at least one metal and/or metalloid is selected from the group consisting of Sc, Ti, V, Cr, Y, Zr, Nb, Mo, Hf, Ta, W, B and Si.

Said at least one metal and/or metalloid may comprise more than one metal and/or metalloid, e.g. two, three, or more metals and/or metalloids. A second metal or metalloid may be present as a dopant. Such second and/or further metals and/or metalloids are preferably selected from the same options for the metals and metalloids as are given above, i.e. they are preferably selected from the group consisting of Sc, Ti, V, Cr, Y, Zr, Nb, Mo, Hf, Ta, W, B and Si. If more than one metal and/or metalloid is present, then said at least one further element should be more electronegative than all of the metals and/or metalloids present.

An example of a preferred doped compound of the invention is tungsten carbide doped with tantalum. Thus, in this embodiment said at least one oxide could be a mixture of tungsten oxide and tantalum oxide.

For the preparation of compounds containing more than one metal and/or metalloid, e.g. wherein the second and/or further metals and/or metalloids are present as one or more dopants, the starting oxide material may include oxides of said one or more further metals and/or metalloids. Alternatively, the source(s) of said one or more further metals and/or metalloids may be in some other form, e.g. in the form of an elemental powder, such as a powder form of iron, aluminum, nickel, or copper.

The amount of dopant present in this instance and generally in the context of the present invention is typically less than 50% by weight relative to the total weight of metals present, preferably 40% or less, more preferably 30% or less, typically 20% or less, most typically 15% or less.

Thus, the reactant mixture typically comprises an oxide of a first metal or metalloid and a source of a second metal or metalloid, wherein the second metal or metalloid is present in an amount of less than 50% by weight relative to the total weight of metals present, preferably 40% or less, more preferably 30% or less, typically 20% or less, most typically 15% or less.

Preferably the amount of dopant is at least 0.01% by weight relative to the total weight of metals present, preferably at least 0.1%, more preferably at least 1%, typically at least 5%.

Preferably, said at least one oxide of at least one metal and/or metalloid comprises at least one selected from the group consisting of $B_2O_3$, $SiO_2$, $Sc_2O_3$, $TiO_2$, $V_2O_5$, $Cr_2O_3$, $Y_2O_3$, $ZrO_2$, $Nb_2O_5$, $MoO_3$, $HfO_2$, $Ta_2O_5$, or $WO_3$.

Said at least one oxide of at least one metal and/or metalloid may be present on the surface of metal/metalloid particles or components, e.g. as a surrounding layer on a metal/metalloid particle that has been exposed to oxidizing conditions. Also, said at least one oxide may include particles containing substantial amounts of oxygen in the form of dissolved oxygen, oxide inclusions and/or oxide coatings, in such amounts that make them unfit for use in some conventional PM (powder metallurgical) techniques.

The granules that may be used in the present invention, which are Ca, Mg, calcium hydride and magnesium hydride, are preferably in the size range of 0.03-2 mm.

As used herein, the term "powder" is meant to describe a collection of particles having a size range of 50 nm-1 mm. For instance, such a powder may comprise or consist essentially of particles which would pass through a 1 mm sieve.

The reducing agent preferably comprises Ca or Mg granules or powder and/or calcium hydride in granule or powder form. More preferably, it comprises Ca granules or powder and/or calcium hydride in granule or powder form. In this latter instance, the ratio between the number of oxygen atoms in the oxide of said metal or metalloid and the number of calcium atoms (O:Ca) is preferably in the range of 1:(1.7-1.1), or 1:(1.5-1.1), or 1:(1.5-1.05), or 1:(1.4-2), or 1:1.2.

Said at least one further element is preferably selected from B, C, N, Si and mixtures of C and N. Preferred molar ratios of the different components in mixtures of C and N are 1:10 to 10:1 in terms of weight, more preferably 1:5 to 5:1, most preferably 1:2 to 2:1, and typically around 1:1. In one preferred aspect of the invention, said at least one further element is selected from B, C, N and mixtures of C and N.

As noted above, it is also possible for B and/or Si to be present as metalloid components. When said metal or metalloid is B and/or Si, said at least one further element is typically other than B and Si.

Thus, the present invention provides a process for manufacturing a compound in powder form, wherein said compound is the reaction product of (i) at least one metal and/or metalloid, and (ii) at least one further element selected from carbon, nitrogen, boron, silicon and mixtures thereof, which process comprises the steps of:

a. mixing at least one oxide of said at least one metal and/or metalloid with a reducing agent, to form a mixture, wherein the reducing agent comprises Ca, Mg, calcium hydride, magnesium hydride or a mixture thereof and is provided in the form of granules or a powder;
b. contacting the mixture with a source of said at least one further element;
c. maintaining said mixture under a $H_2$ atmosphere at a temperature of from 950° C. to 1500° C. for from 1 to 10 hours; and
d. recovering said compound in powder form;

provided that if said at least one metal and/or metalloid is boron and/or silicon, then said at least one further element is not boron or silicon.

In a preferred embodiment, said at least one further element is carbon and/or nitrogen. In this instance, said compound in powder form will be a carbide, nitride, or carbonitride of said at least one metal and/or metalloid. In a more preferred aspect of the invention, said at least one further element is carbon and said compound in powder form is a carbide of said at least one metal and/or metalloid. In both of these instances, said at least one metal and/or metalloid is preferably selected from Sc, Ti, V, Cr, Y, Zr, Nb, Mo, Hf, Ta, W, B, Si, and mixtures thereof, and more preferably from Nb, Ti, Cr, W and mixtures thereof.

In a preferred aspect of the invention, said compound in powder form is selected from $B_4C$, SiC, ScC, TiC, VC, $Cr_3C_2$, $Cr_7C_3$, $YC_2$, ZrC, NbC, $Nb_2C$, $Mo_2C$, HfC, TaC, $Ta_2C$, WC, $W_2C$, and solid mixtures of two or more of these carbides.

It is possible for said at least one further element to comprise more than one element. For instance, in one embodiment both carbon and nitrogen are used in the process of the invention, in order to prepare a carbonitride of the relevant metal(s) and/or metalloid(s). In this instance the molar ratio of carbon:nitrogen is preferably 1:2 to 2:1, more preferably around 1:1.

The source(s) of said at least one further element are not particularly limited. For instance, a given element may be provided in solid form, such as powder or granules containing a proportion of the desired element, which can be mixed with said at least one oxide of said at least one metal and/or metalloid and the reducing agent. By way of example, when said at least one further element includes carbon, the source may include or may be solid graphite particles. Alternatively, the source may be provided in gaseous form. By way of example, when said at least one further element includes nitrogen, the source may include or may be nitrogen gas, and when said at least one further element includes carbon, the source may include or may be methane gas. In any event, the source can be introduced before, during or after the reduction reaction, but preferably before or during the reduction reaction, typically during the reduction reaction.

If said at least one further element includes boron, the source of said at least one further element may include or may be boron hydroxide or boron oxide. If said at least one further element includes silicon, the source of said at least one further element may include or may be silicon dioxide.

As mentioned above, the source of said one or more further elements may be introduced before or during the reduction reaction. In these aspects of the invention, reduction of the oxide and formation of the desired compound in particle form may occur simultaneously.

Step c of the process of the invention involves maintaining the mixture under a $H_2$ atmosphere at a temperature of from 950° C. to 1500° C. for 1 to 10 hours. Preferably said temperature is from 950° C. to 1400° C., more preferably 950° C. to 1200° C., more preferably still 950° C. to 1150° C., such as around 1000° C., around 1050° C., or around 1100° C. The time for which the temperature is maintained is preferably at least 1.5 hours. The time for which the temperature is maintained is preferably 8 hours or less, more preferably 6 hours or less, and most preferably 4 hours or less. Typically it is around 2 or 3 hours, most typically around 2 hours.

Said $H_2$ atmosphere may be an atmosphere of essentially pure hydrogen or it may be a hydrogen containing atmosphere, wherein the content of hydrogen is at least 50% by volume, preferably at least 80%, more preferably at least 90%.

In a preferred aspect, the process of the invention further comprises between steps (c) and (d) a step of switching the $H_2$ atmosphere to an Ar or $N_2$ atmosphere and then (i) maintaining the mixture thereunder for a period of time, typically at least 20 minutes, and/or (ii) cooling the mixture under Ar or $N_2$ atmosphere. In step (i) the mixture is typically maintained at a temperature of 950° C. to 1500° C., preferably 950° C. to 1400° C., more preferably 950° C. to 1200° C., more preferably still 950° C. to 1150° C., such as around 1000° C., around 1050° C., or around 1100° C. It may conveniently just be maintained at the same temperature as was being used under the preceding $H_2$ atmosphere. In step (i) the mixture is maintained under the Ar or $N_2$ atmosphere for at least 20 minutes, preferably at least 40 minutes, more preferably at least 50 minutes. It can be maintained under the Ar or $N_2$ atmosphere for longer, e.g. up to 80 minutes, or up to 2, 3 or 5 hours, but generally there is not much to be gained by exceeding 5 hours. Thus, in a preferred aspect the process of the invention as defined herein further comprises between steps (c) and (d) the steps of;
  c1. switching the $H_2$ atmosphere to an Ar or $N_2$ atmosphere and maintaining the mixture thereunder for a period of at least 1 hour, followed by;
  c2. cooling under Ar or $N_2$ atmosphere.

Where Ar and $N_2$ atmospheres are mentioned as alternatives, an Ar atmosphere may be preferred in most instances, but an $N_2$ atmosphere may be used if said at least one further element includes nitrogen, e.g. if the end product is a nitride.

$N_2$ atmosphere is generally used when said at least one further element comprises nitrogen, and otherwise an Ar may generally be used.

Also, said compound in powder form obtainable by the process of the present invention may be subjected to washing and drying steps.

In a preferred aspect, the process of the invention comprises the steps of:
  a. mixing at least one oxide of at least one metal and/or metalloid in powder form with a reducing agent comprising Ca or Mg granules or powder and/or calcium hydride in granule or powder form, to form a mixture;
  b. exposing the mixture to a source of carbon;
  c. maintaining said mixture under a $H_2$ atmosphere at a temperature of from 950° C. to 1200° C. for 2-4 hours; and
  d. recovering a carbide of said at least one metal and/or metalloid in powder form.

Preferably in this aspect of the invention, said at least one metal and/or metalloid is selected from Sc, Ti, V, Cr, Y, Zr, Nb, Mo, Hf, Ta, W, B, Si and mixtures thereof.

In another preferred aspect of the invention, said at least one metal and/or metalloid is at least one metal (i.e. it does not include any metalloids), and said at least one further element is boron and/or silicon. More preferably said at least one further element is boron or silicon. In this aspect of the invention, the compound of the invention in powder form is a metal boride or a metal silicide. In this regard, said at least one metal is preferably selected from Sc, Ti, V, Cr, Y, Zr, Nb, Mo, Hf, Ta, W and mixtures thereof.

The present invention provides compounds in powder form, which enjoy surprisingly high levels or purity and/or crystallite sizes which are surprisingly small for substances of this type.

The content of oxygen in the compound in powder form of the invention is preferably 2% or less, more preferably 1.5% or less, more preferably still 1% or less, most preferably 0.8% or less.

The content of hydrogen in the compound in powder form of the invention is preferably 0.5% or less, more preferably 0.1% or less, most preferably 0.05% or less.

In the instance that the compound in powder form of the invention is not a nitride or carbonitride, the content of nitrogen is preferably 0.5% or less, more preferably 0.1% or less, most preferably 0.05% or less.

The amount of contaminants (e.g. oxygen or nitrogen) in the final product may be determined by combustion analysis and detection by way of IR absorption (to determine oxygen levels) or by thermic conductivity (to determine nitrogen levels).

As regards the particle size and particle size distribution for the compound in powder form of the invention, the $X_{50}$ is preferably 80 μm or less, more preferably 60 μm or less, more preferably still 40 μm or less, and typically 20 μm or less. Typically it is at least 0.1 μm, more typically at least 0.5 μm.

The $X_{10}$ is preferably 40 μm or less, more preferably 20 μm or less, more preferably still 10 μm or less, and typically 5 μm or less. Typically it is at least 0.05 μm, more typically at least 0.1 μm.

The $X_{90}$ is preferably 100 μm or less, more preferably 80 μm or less, more preferably still 60 μm or less, and typically 40 μm or less. Typically it is at least 0.5 μm, more typically at least 1 μm.

The SMD is preferably at least 0.1 μm, more preferably at least 0.5 μm. The SMD is preferably 20 μm or less, more preferably 10 μm or less.

The VMD is preferably at least 0.1 μm, more preferably at least 0.5 μm. The VMD is preferably 30 μm or less, more preferably 20 μm or less.

The $S_v$ is preferably at least 0.1 m$^2$/cm$^3$, more preferably at least 0.5 m$^2$/cm$^3$. The $S_v$ is preferably 20 m$^2$/cm$^3$ or less, more preferably 10 m$^2$/cm$^3$ or less.

The $S_m$ is preferably at least 5×10$^3$ cm$^2$/g, more preferably at least 10×10$^3$ cm$^2$/g. The $S_m$ is preferably 10×10$^4$ cm$^2$/g or less, more preferably 8×10$^4$ cm$^2$/g or less.

The above particle size and size distribution characteristics (i.e. $X_{10}$, $X_{50}$, $X_{90}$, SMD, VMD, $S_v$, and $S_m$) may be measured using a Sympatec technique. Preferably they are measured using laser diffraction. Particle size distribution $X_{50}$ (sometimes denoted $D_{50}$) is also known as the median diameter or the medium value of the particle size distribution, and is the value of the particle diameter at 50% in the cumulative distribution. The $X_{50}$ distribution is discussed at pages 216-218 of "Metals Handbook", 9th Edition, Volume 7, Powder Metallurgy, American Society for Metals, Metals Park, Ohio 44073, ISBN 0-87170-013-1.

The process of the present invention involves the reduction of at least one oxide of at least one metal and/or metalloid. It is preferred to perform the reduction under conditions which will avoid the initiation of a strong exothermic reaction. In this sense, a "strong" exothermic reaction is interpreted as an un-controlled, thermal runaway reaction. It is believed that such an uncontrolled exothermic reaction (e.g. self-ignition combustion synthesis) leads to less pure material.

Steps that may be taken to control potentially strong reactions are using a specific ratio between oxygen and calcium, such as the preferred ratios specified above, and/or maintaining the reactants in non-compacted form. Nevertheless, if it is necessary to use a compacted form of reactants, these should ideally be in the form of thin plates, pellets, or granules.

As regards the equipment that may be used to carry out the process of the invention, the following embodiments are preferred:

For the furnace, any type of furnace suitable for working under temperatures for the reduction reaction, i.e. up to 1500° C. may be used. The furnace should also be fitted with means for supplying various types of gases, or in some cases applying vacuum. Preferably a muffle open furnace may be used to perform the process of the invention.

A rectangular cross section crucible with a flat base may also be used. The crucible is preferably made of high temperature resistant material such as e.g. chromium nickel steel (253 MA). The crucible may be introduced to the furnace at each heat treatment process.

As noted above, the heat treatment may be performed at different temperatures and for differing durations. The real temperature of the furnace may be measured using a thermocouple to compare it with the set temperature. The difference in temperature between real temperature and set temperature is typically less than 10° C.

Containers filled with water may be used for washing the obtained product. The product of the process of the invention may be added to the water and washed. Containers for use in this regard may preferably be equipped with stirrers to stir the mixture of water and the product. Acetic acid may be added to the slurry with continuous stirring. After washing, the resulting powder is typically dried.

EXAMPLES

Example 1—Preparation of Niobium Carbide

Niobium oxide powder was used as the starting material for making niobium carbide powder. The starting materials were thoroughly mixed and then heat treated to conduct the reduction reaction process to achieve the niobium carbide powder. Heat treatment was performed at a temperature of 1100° C. for two hours. Heating session was performed under hydrogen gas environment and the cooling session (for one hour) was under argon gas protection for dehydrogenation. The final product powder was analyzed to evaluate the NbC powder quality.

Niobium Oxide ($Nb_2O_5$) Powder:

The particles sizes and their distribution in the Niobium oxide ($Nb_2O_5$) were analyzed using Sympatec technique, which used to analyze the material's particles morphology at dry status. The analysis curve was as follows:

$x_{10}$=3.50 µm $x_{50}$=21.92 µm $x_{90}$=47.92 µm SMD=7.54 µm VMD=24.51 µm $x_{16}$=7.20 µm $x_{84}$=41.34 µm $x_{99}$=73.88 µm $S_V$=0.80 m$^2$/cm$^3$ $S_m$=7961.47 cm$^2$/g

Figure 2A:
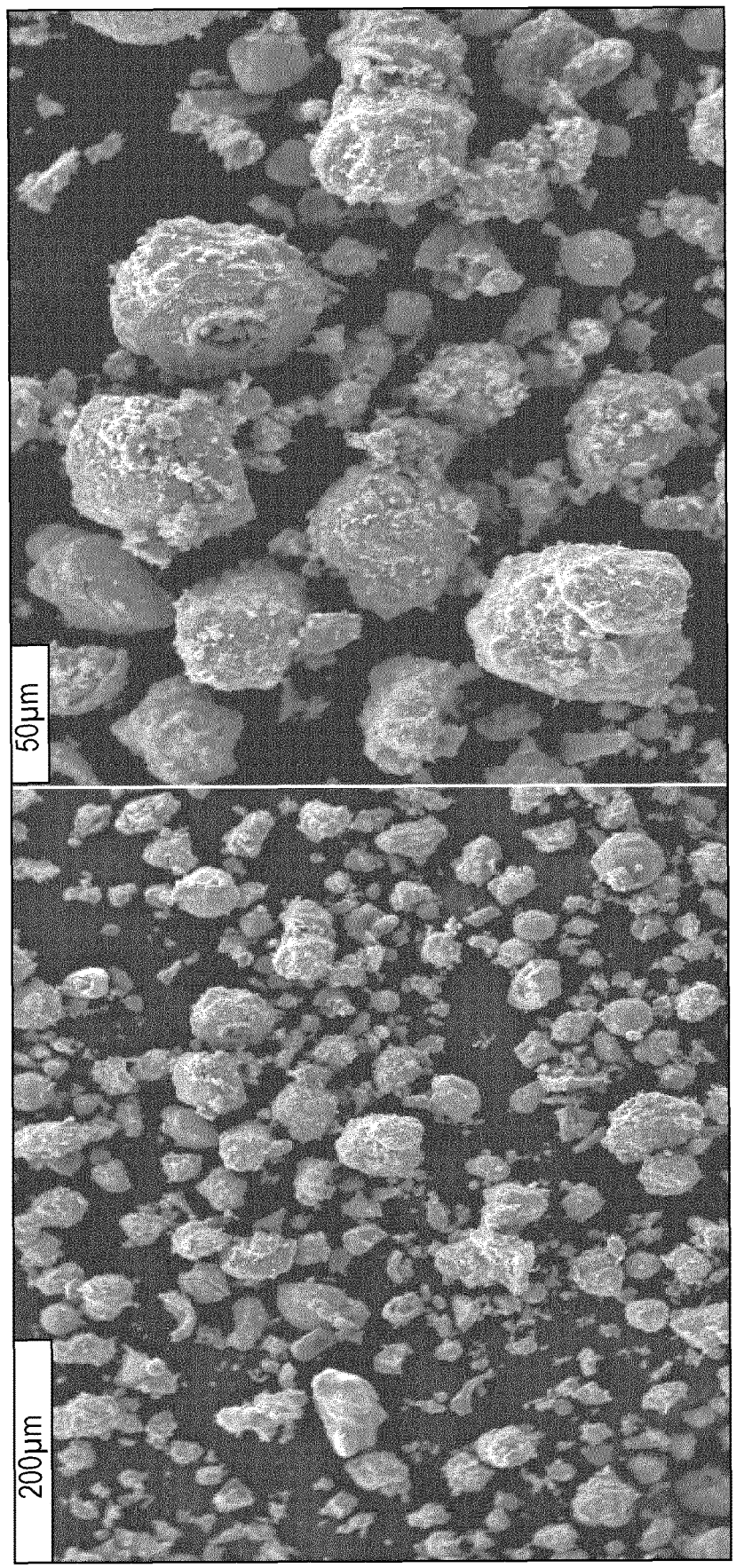
FIGS. 2A and 2B depict SEM micrographs for the $Nb_2O_5$ powder.
Figure 2B:
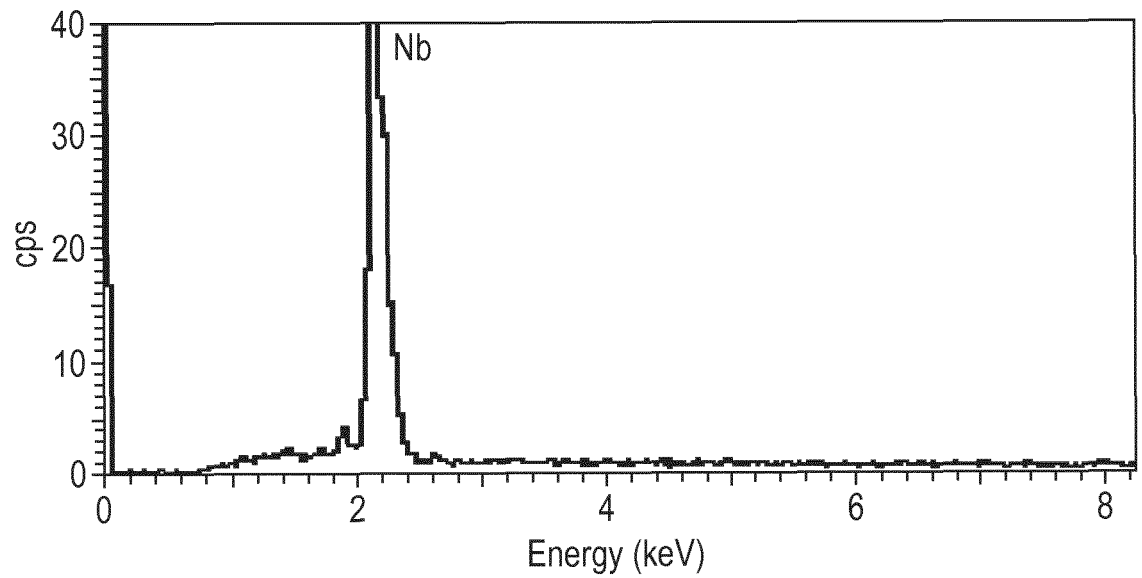

FIG. 1 depicts a Sympatec curve showing the particle size distribution of the $Nb_2O_5$ powder used for making the niobium carbide powder. The particles size distribution analysis results of the Nb2O5 showed that the X90 of the material's particle sizes were of 47.92 micron. $Nb_2O_5$ powder was analyzed for its particles morphology using the SEM analysis. The SEM micrographs were as shown in FIG. 2.

Figure 3:
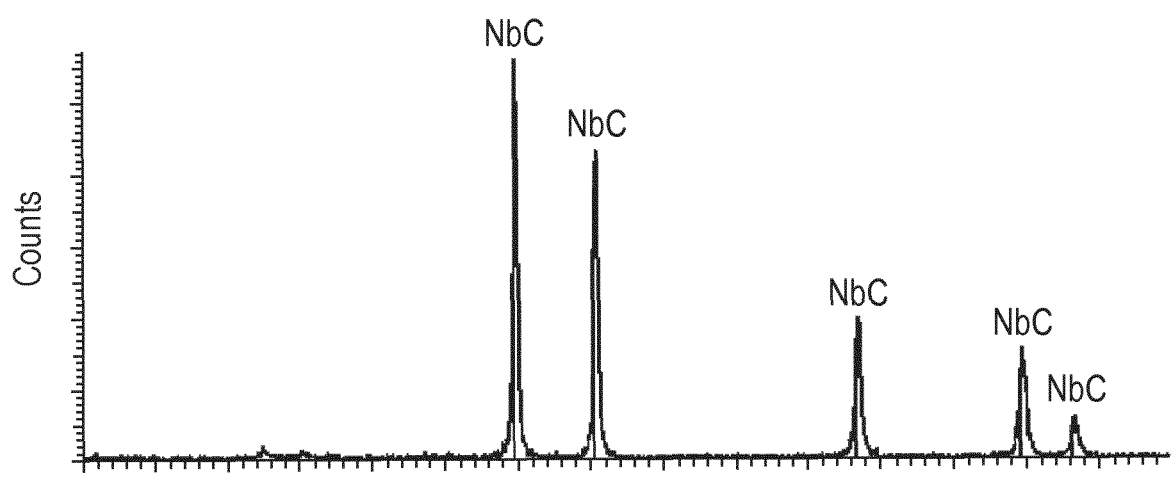
FIG. 3 depicts the XRD results of the final product powder for the niobium carbide powder.

Niobium Carbide Powder Analysis:

The niobium carbide powder was analyzed using different analyses techniques. The NbC analyses results were as follows. The XRD results of the final product powder were as shown in FIG. 3. This showed that NbC phase is the only phase of material. There were no other materials shown even as minor phases. This confirmed that the final product powder of niobium carbide was very clean material powder.

Figure 4:
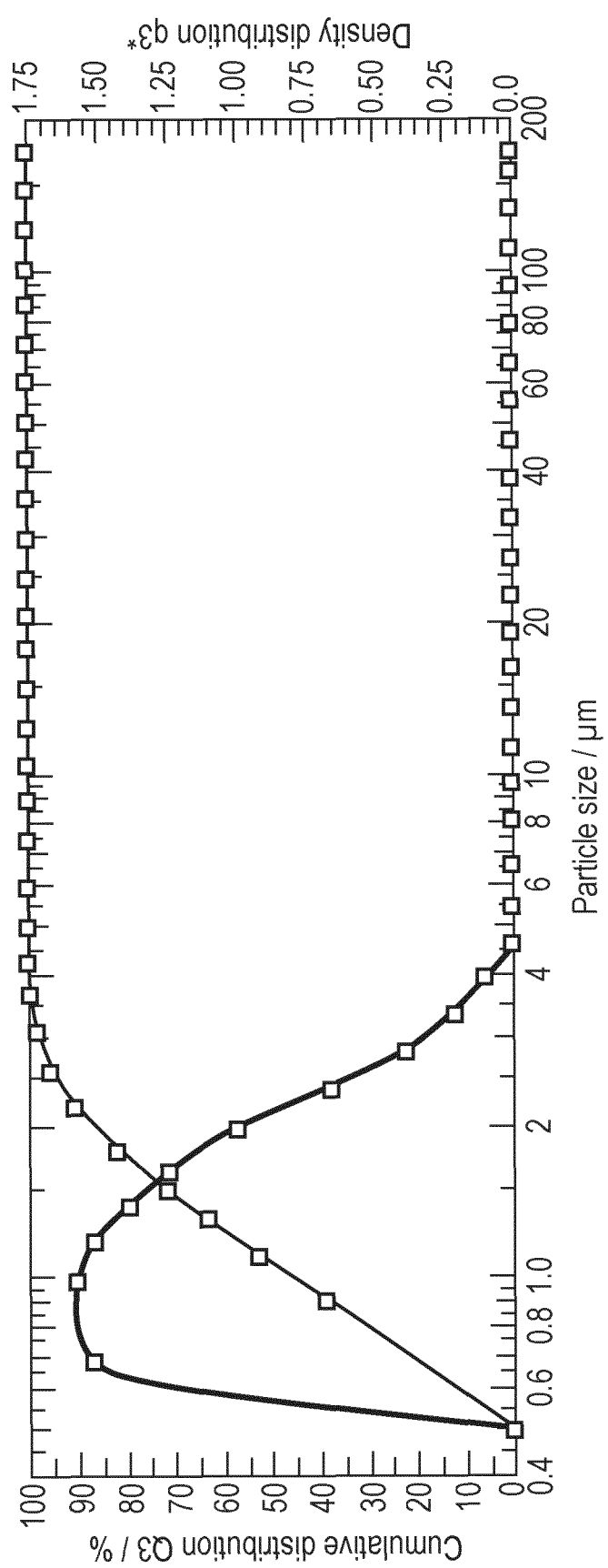
FIG. 4 depicts Sympatec analysis for the final powder product of the niobium carbide powder.

The Sympatec (for particles size and their distribution) analysis for the final powder product is depicted in FIG. 4.

$x_{10}$=0.60 µm $x_{50}$=1.07 µm $x_{90}$=2.19 µm SMD=1.02 µm VMD=1.26 µm $x_{16}$=0.67 µm $x_{84}$=1.91 µm $x_{99}$=3.54 µm $S_V$=5.88 m$^2$/cm$^3$ $S_m$=58776.70 cm$^2$/g

The Sympatec curve of the final NbC powder showed that the X90 of the particles were in the range of 2.19 micron.

The elemental analysis for the residuals in the final product of the niobium carbide powder was according to the following results:

|  | Hydrogen [%] | Oxygen [%] | Nitrogen [%] |
|---|---|---|---|
| NbC | 0.025 | 0.78 | 0.019 |

Figure 5:
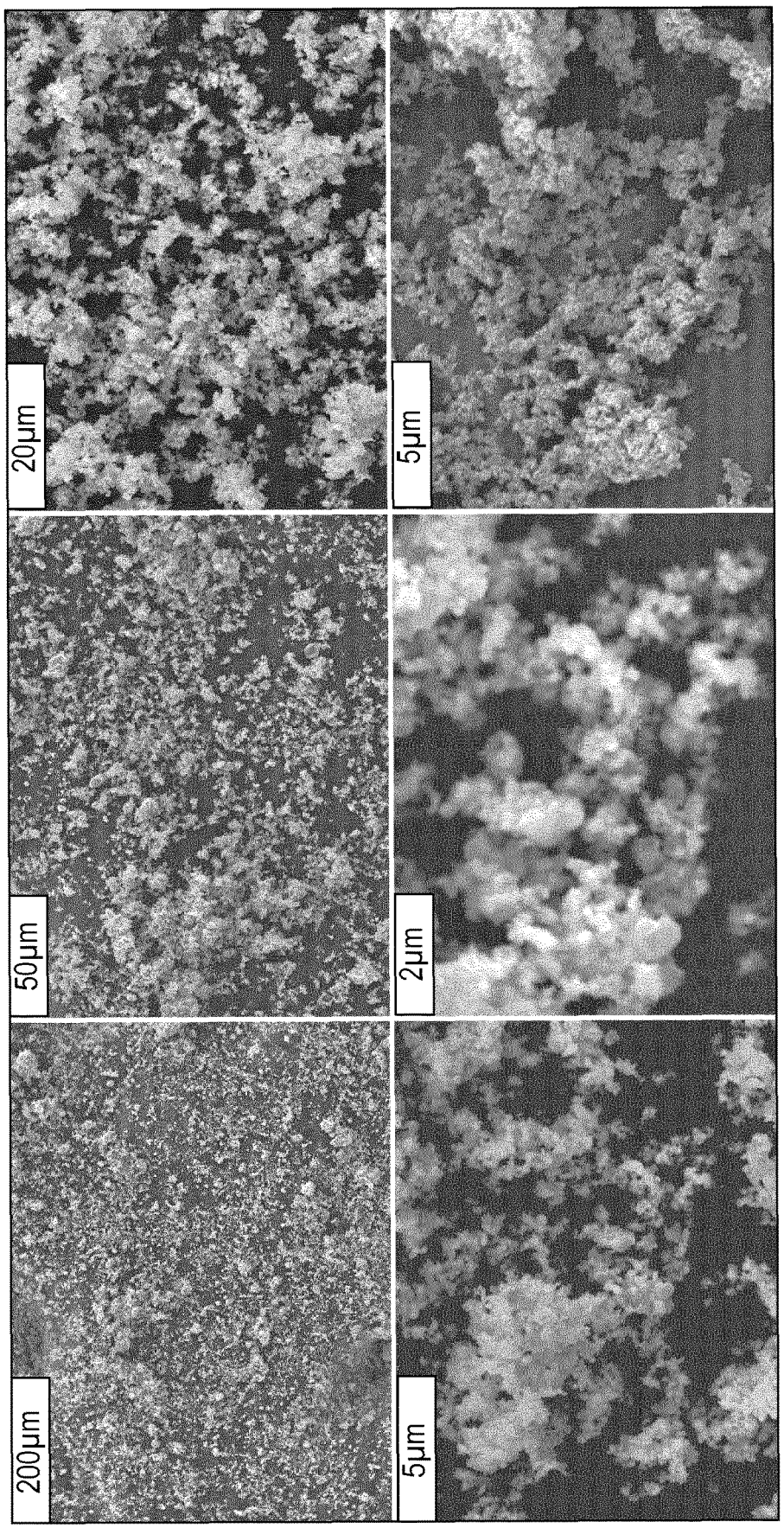
FIG. 5 shows that the majority of niobium carbide powder particles were of close to rounded shape particles and irregular shapes.

Niobium Carbide Powder Microstructure Investigation Using SEM Analysis:

Samples of the niobium carbide powder were gold platted as preparation for the SEM analysis investigation. The SEM micrographs showed that the material consisted of large and small agglomerated particles as bulky shape and fluffy form of very fine particles. The particles were of different shapes, the majority of the particles were of close to rounded shape particles and as irregular shapes as shown in FIG. 5.

Figure 6:
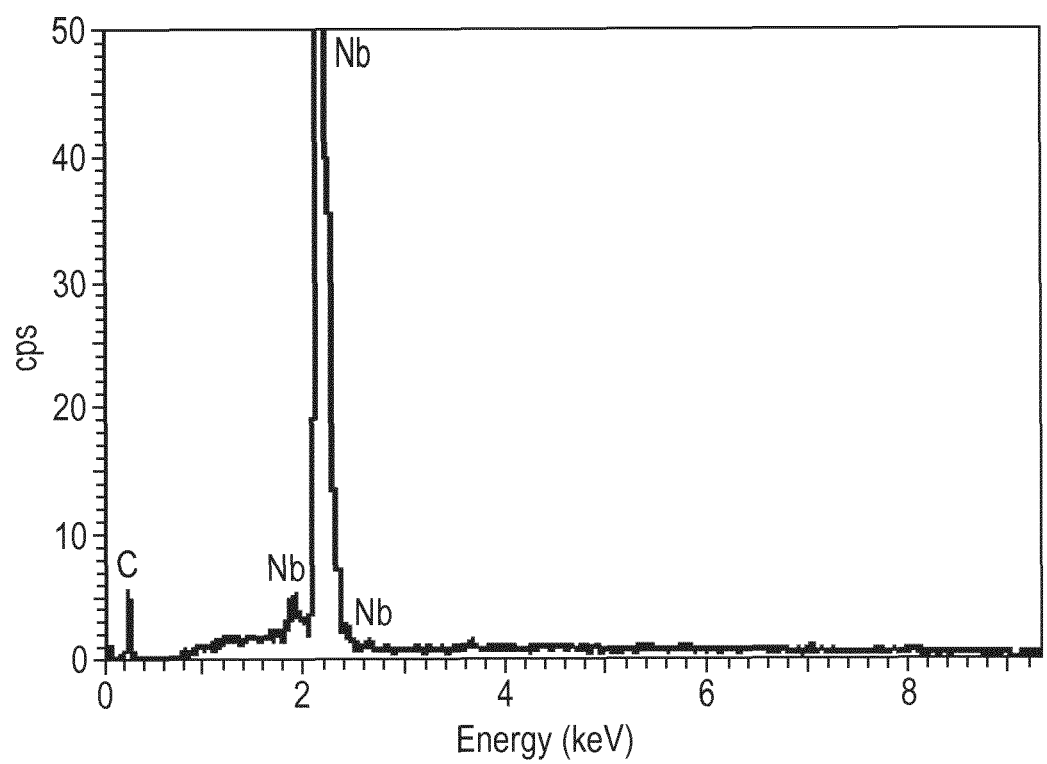
FIG. 6 depicts the EDS spectrum of the final product powder of niobium carbide.

EDS Quantitative Analysis of the Niobium Carbide Powder was as Follows:

FIG. 6 depicts the EDS spectrum of the final product powder of niobium carbide, and showed the Nb and C as the only existing peaks. This means that the material was very clean and no remaining residuals were detected in the final product of niobium carbide powder.

Example 2—Preparation of Niobium Nitride

Figure 7:
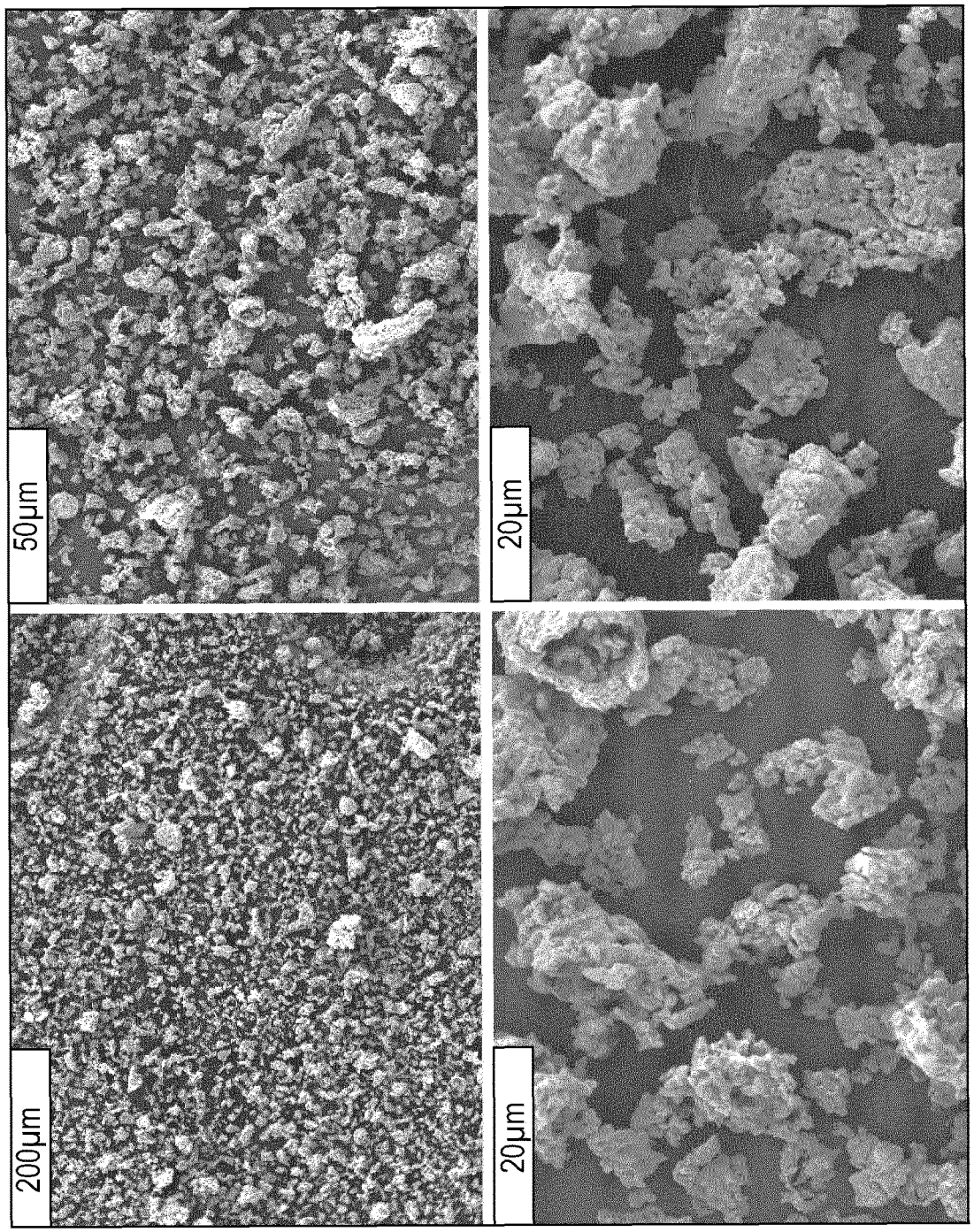
FIG. 7 shows SEM micrographs of NbN powder.
Figure 8:
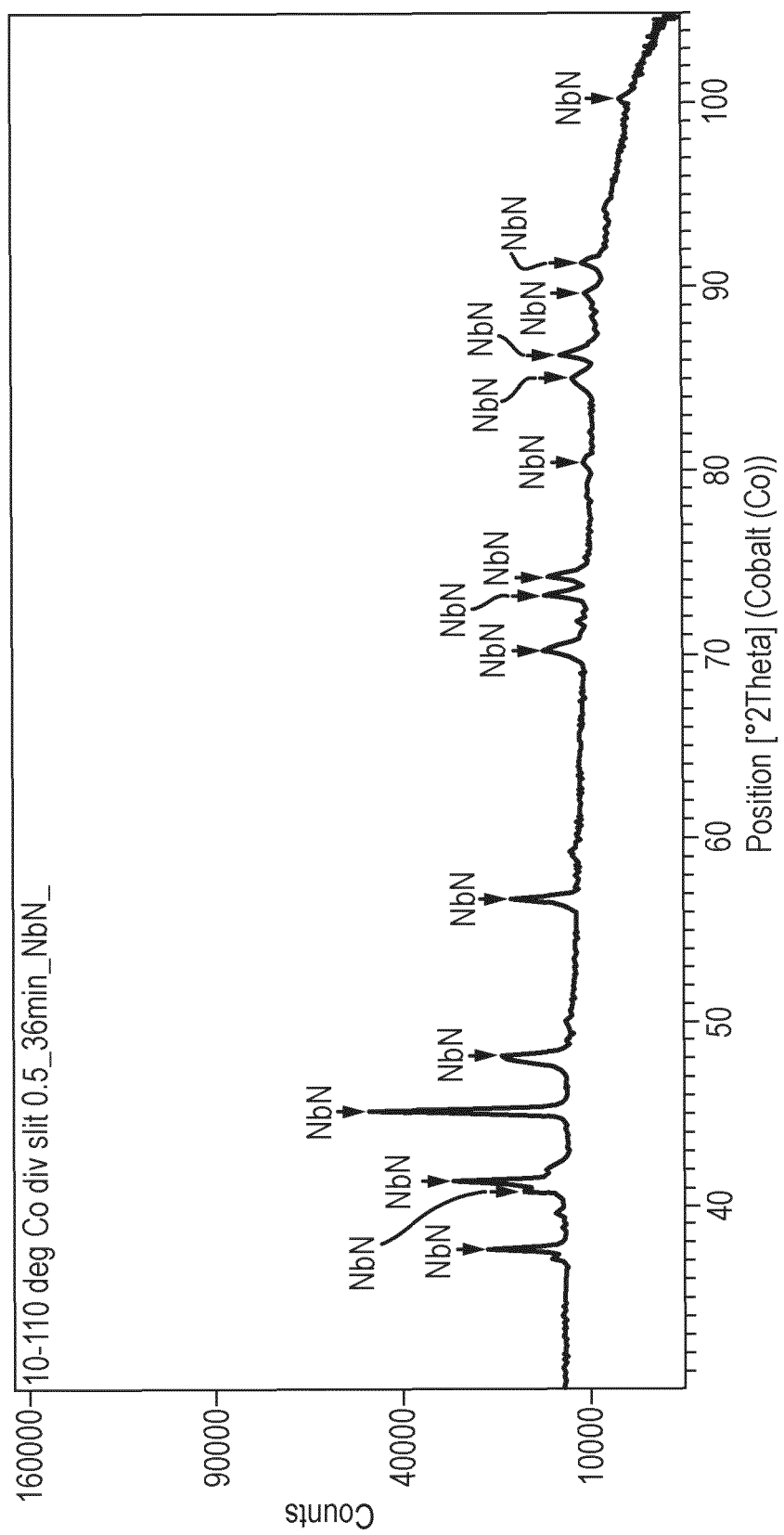
FIG. 8 depicts the NbN XRD pattern.

Niobium Nitride powder was produced from the niobium oxide powder and the reducing agent by performing the reduction reaction process during heat treatment process. Heat treatment of the thoroughly mixed starting materials of the niobium oxide powder and the reducing agent granules was carried out at a temperature of 1100° C. for 2 hours. Heating session was performed under hydrogen gas protection and then 1 hour under nitrogen gas environment for nitriding. FIG. 7 shows SEM micrographs of the NbN powder. The NbN XRD pattern is depicted in FIG. 8.

Scan condition: From 10° to 110°; Step size: 0.01°; Scan step time: 68 s

Phase Analysis:

| No. | Ref. Code | Compound Name | Chemical Formula | Score | Semi Quant [%] |
|---|---|---|---|---|---|
| 1 | 98-007-6384 | Niobium(III) Nitride - Delta | N1 Nb1 | 76 | 67 |

-continued

| Ref.<br>No. | Code | Compound Name | Chemical Formula | Score | Semi Quant [%] |
|---|---|---|---|---|---|
| 2 | 98-060-4392 | Niobium Nitride (1/1) | N1 Nb1 | 42 | 33 |

The Above mentioned XRD pattern showed that the final product material from the reduction reaction of the niobium oxide powder and a proper reducing agent was niobium nitride phase of material. The pattern also showed that there was no other material showed even as very minor phase.

$X_{10}$=1.85 µm $x_{50}$=8.32 µm $x_{90}$=19.82 µm SMD=4.38 µm VMD=10.00 µm $x_{16}$=2.76 µm $x_{84}$=16.73 µm $x_{99}$=38.38 µm $S_V$=1.37 m²/cm³ $S_m$=13698.85 cm²/g

Figure 9:
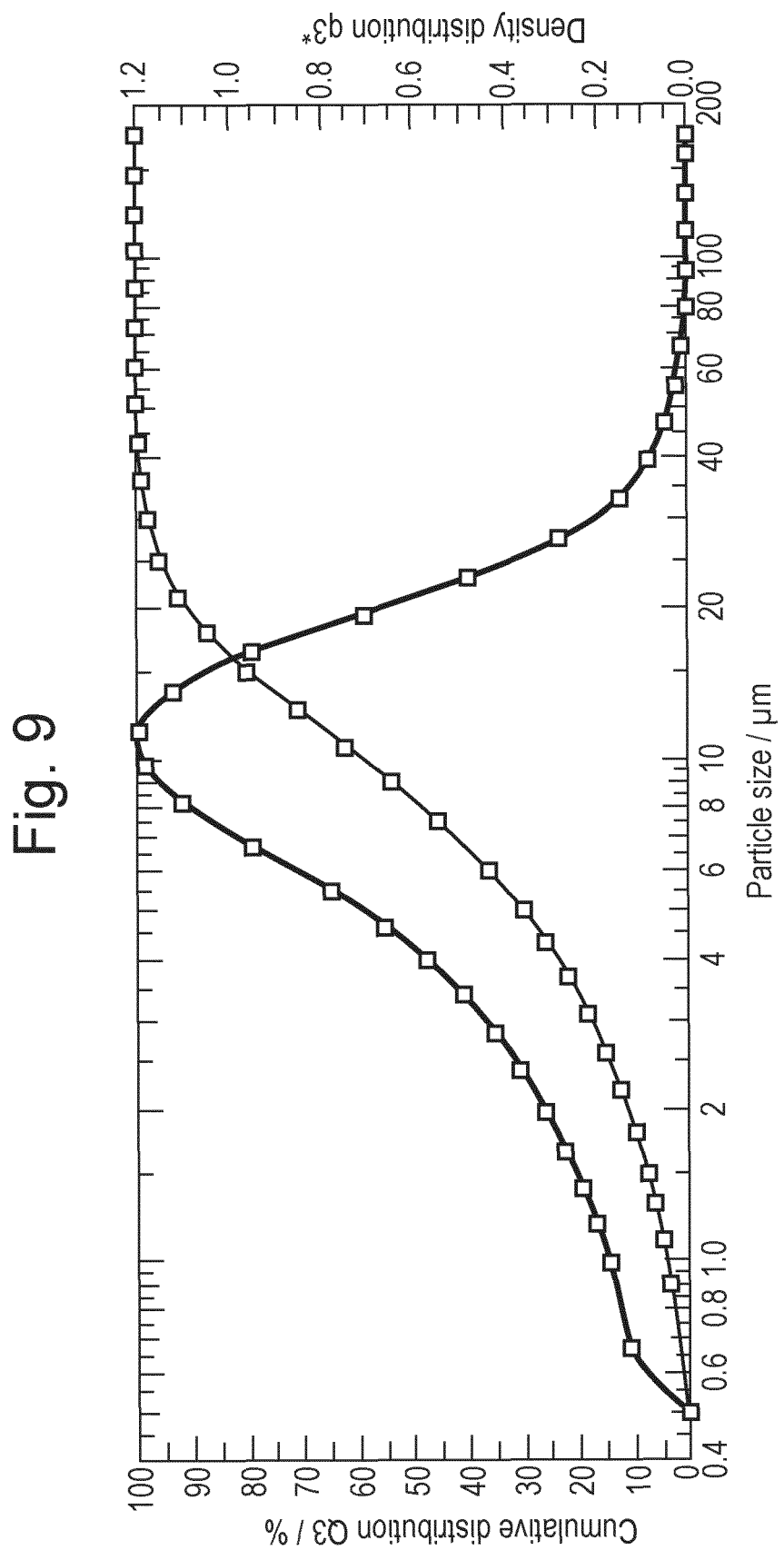
FIG. 9 depicts Sympatec analysis result of the NbN powder.

FIG. 9 depicts Sympatec analysis results of the NbN powder. This showed that 50% of the particles were in the range of 8.3 micron and 90% of the particles were in the range of 19.82 micron sizes.

Example 3—Preparation of Titanium Nitride Powder

The starting materials were titanium dioxide powder and the certain reducing agent locally made as granules. After thoroughly mixing of the starting materials, the heat treatment was at a temperature of 1000° C. for 2 hours under Hydrogen gas protection and then 1 hour under nitrogen gas environment for nitriding.

Figure 10:
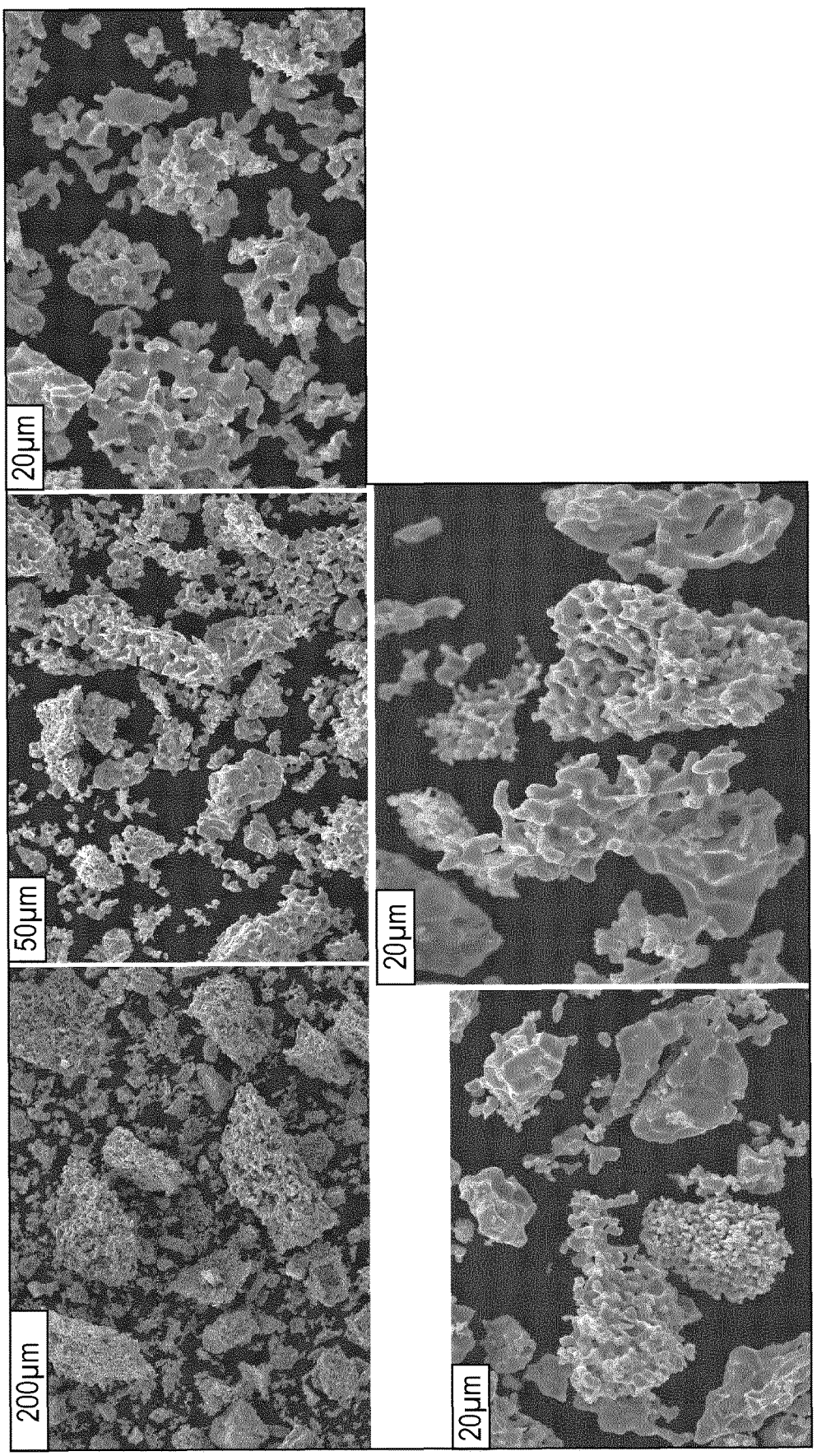
FIG. 10 depicts SEM micrographs of the TiN powder made from titanium oxide powder and reducing agent.
Figure 11A:
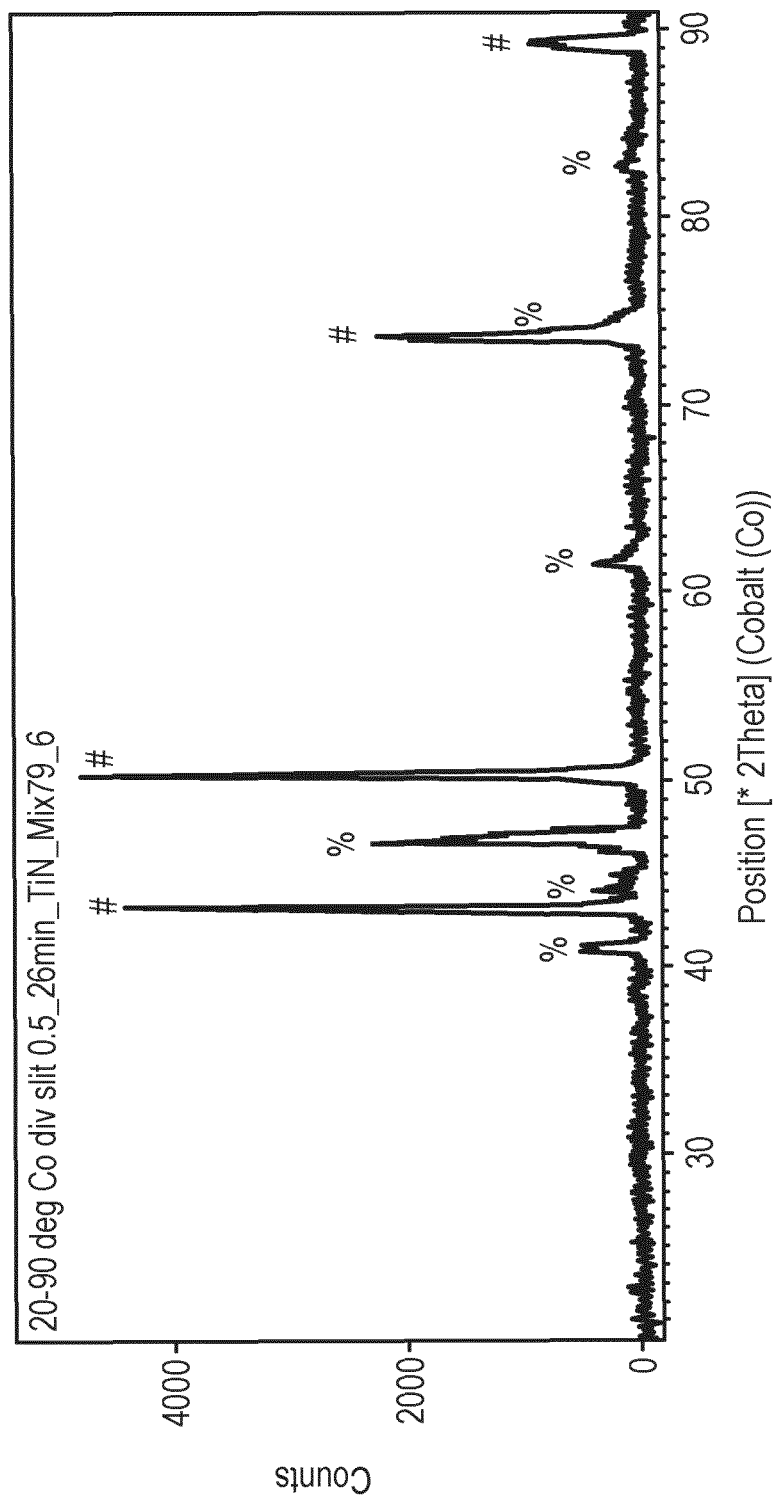

FIG. 10 depicts SEM micrographs of the TiN powder made from the titanium oxide powder and the reducing agent. The XRD pattern of the TiN powder is depicted in FIG. 11.

Scan condition: From 20° to 90°; Step size: 0.01°; Scan step time: 68 s
Phase Analysis:

| No. | Ref. Code | Compound Name | Chemical Formula | Score | Semi Quant [%] |
|---|---|---|---|---|---|
| # | 98-006-4906 | Osbornite | N0.88 Ti0.88 | 60 | 72 |
| % | 98-010-8614 | Titanium Nitride (0.83/0.17) | N0.17 Ti0.83 | 48 | 28 |

$x_{10}$=2.29 µm $x_{50}$=10.31 µm $x_{90}$=36.89 µm SMD=5.35 µm VMD=15.44 µm $x_{16}$=3.52 µm $x_{84}$=26.68 µm $x_{99}$=75.21 µm $S_V$=1.12 m²/cm³ $S_m$=11213.53 cm²/g

| cumulative distribution | | | | | |
|---|---|---|---|---|---|
| | cumulative | | density distribution (log.) | | |
| upper band limit $x_0$/µm | distribution $Q_3$/% | residue distribution $(1-Q_3)$/% | fraction in band $dQ_3$/% | mean size for $x_m$/µm | density band $q_3$lg |
| 0.90 | 2.45 | 97.55 | 2.45 | 0.67 | 0.10 |
| 1.10 | 3.58 | 96.42 | 1.13 | 0.99 | 0.13 |
| 1.30 | 4.71 | 95.29 | 1.12 | 1.20 | 0.15 |
| 1.50 | 5.81 | 94.19 | 1.11 | 1.40 | 0.18 |
| 1.80 | 7.44 | 92.56 | 1.62 | 1.64 | 0.21 |
| 2.20 | 9.54 | 90.46 | 2.10 | 1.99 | 0.24 |
| 2.60 | 11.56 | 88.44 | 2.02 | 2.39 | 0.28 |
| 3.10 | 14.00 | 86.00 | 2.44 | 2.84 | 0.32 |
| 3.70 | 16.85 | 83.15 | 2.85 | 3.39 | 0.37 |
| 4.30 | 19.69 | 80.31 | 2.84 | 3.99 | 0.43 |
| 5.00 | 23.06 | 76.94 | 3.37 | 4.64 | 0.52 |
| 6.00 | 28.07 | 71.93 | 5.01 | 5.48 | 0.63 |
| 7.50 | 35.89 | 64.11 | 7.82 | 6.71 | 0.81 |
| 9.00 | 43.69 | 56.31 | 7.80 | 8.22 | 0.99 |
| 10.50 | 50.93 | 49.07 | 7.24 | 9.72 | 1.08 |
| 12.50 | 59.25 | 40.75 | 8.32 | 11.46 | 1.10 |
| 15.00 | 67.30 | 32.70 | 8.05 | 13.69 | 1.02 |
| 18.00 | 74.09 | 25.91 | 6.79 | 16.43 | 0.86 |
| 21.00 | 78.63 | 21.37 | 4.54 | 19.44 | 0.68 |
| 25.00 | 82.79 | 17.21 | 4.16 | 22.91 | 0.55 |
| 30.00 | 86.40 | 13.60 | 3.62 | 27.39 | 0.46 |
| 36.00 | 89.62 | 10.38 | 3.22 | 32.86 | 0.41 |
| 43.00 | 92.56 | 7.44 | 2.94 | 39.34 | 0.38 |
| 51.00 | 95.13 | 4.87 | 2.56 | 46.83 | 0.35 |
| 61.00 | 97.35 | 2.65 | 2.22 | 55.78 | 0.29 |
| 73.00 | 98.88 | 1.12 | 1.53 | 66.73 | 0.20 |
| 87.00 | 99.66 | 0.34 | 0.78 | 79.69 | 0.10 |
| 103.00 | 99.93 | 0.07 | 0.27 | 94.66 | 0.04 |
| 123.00 | 100.00 | 0.00 | 0.07 | 112.56 | 0.01 |
| 147.00 | 100.00 | 0.00 | 0.00 | 134.47 | 0.00 |
| 175.00 | 100.00 | 0.00 | 0.00 | 160.39 | 0.00 | evaluation: WINDOX 5.4.1.0, HRLD stabil.1
reference measurement: 04-16 14:41:04
trigger condition: PQC
time base: 100,00 ms
start: c.opt >=2.1%
valid: always
stop: 5 s c.opt <=1.9% or 99 s real time product: Fe-pulver R3
$C_{opt}$ = 10.67%
dispersing method: 40%, 1.0 mm vibricontrol, 6%
cascade: 0
pressure: 3.05 bar, vacuum: 107.00 mbar
revolution: 0.00%
doser: VIBRI, feed rate: 40.00%

Figure 12:
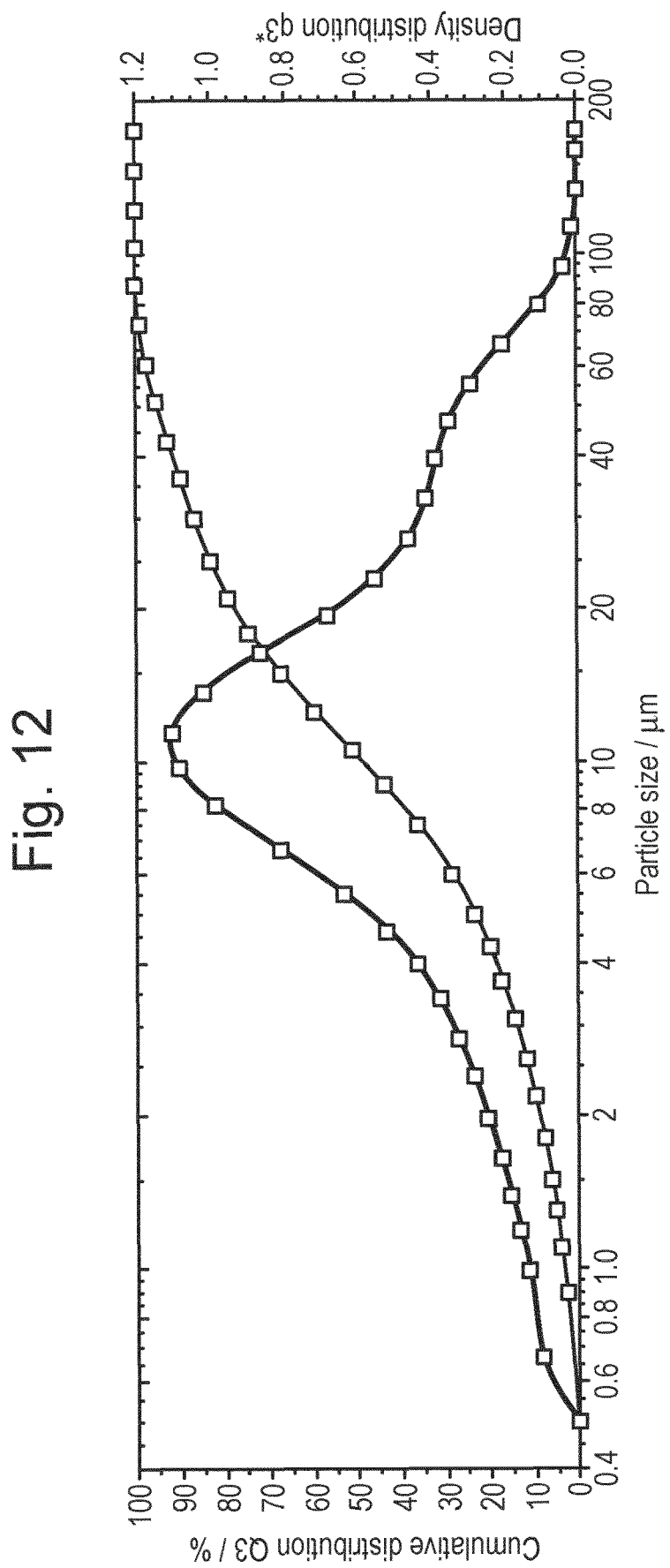
FIG. 12 depicts Sympatec analysis results of the TiN powder.

User Parameters:
FIG. 12 depicts Sympatec analysis results of the TiN powder.

Example 4—Preparation of Titanium Carbide Powder

Figure 13A:
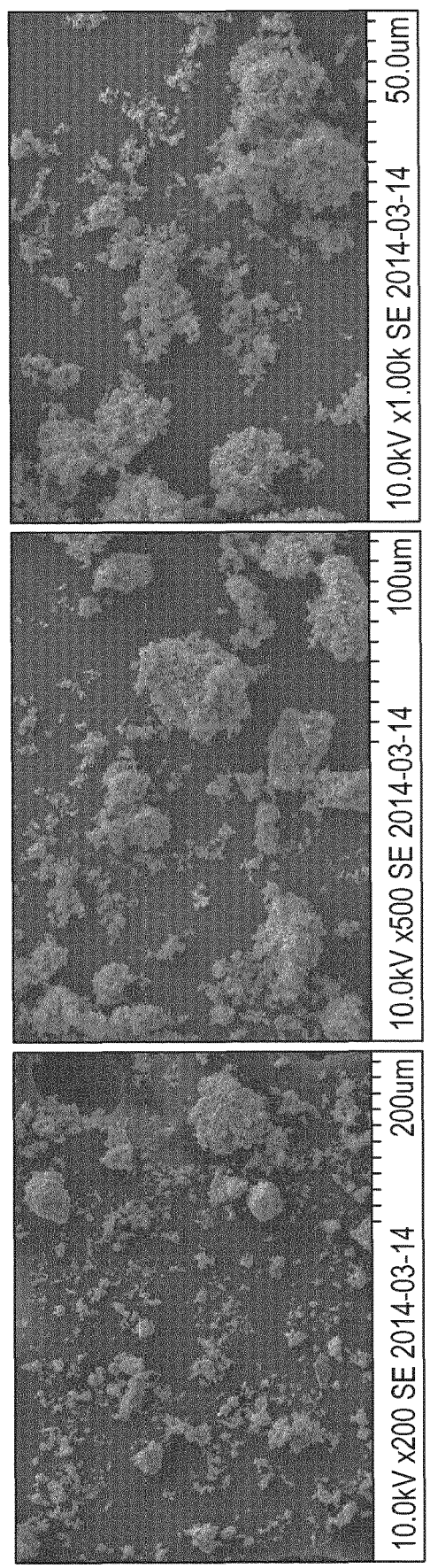
Figure 13C:
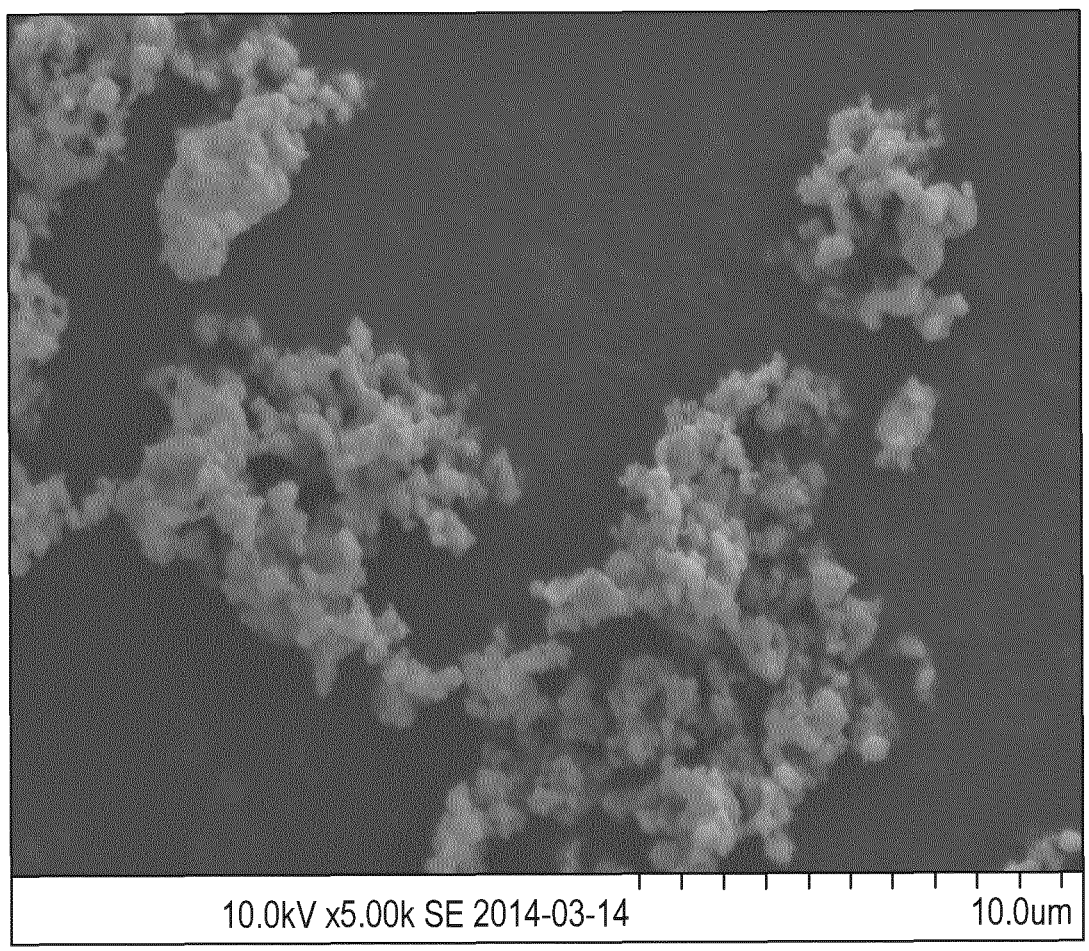
Figure 14A:
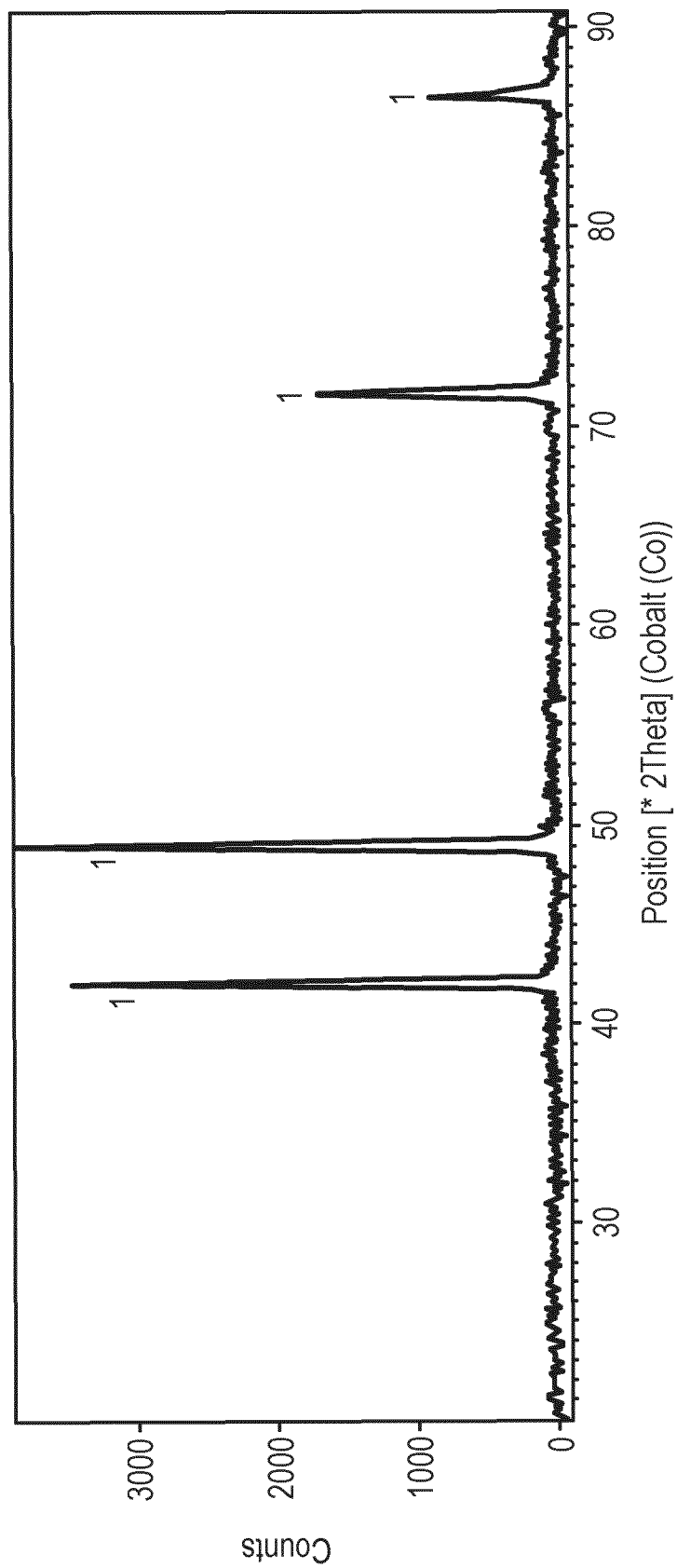
FIGS. 14A and 14B depict the XRD pattern of the titanium carbide powder.
Figure 14B:
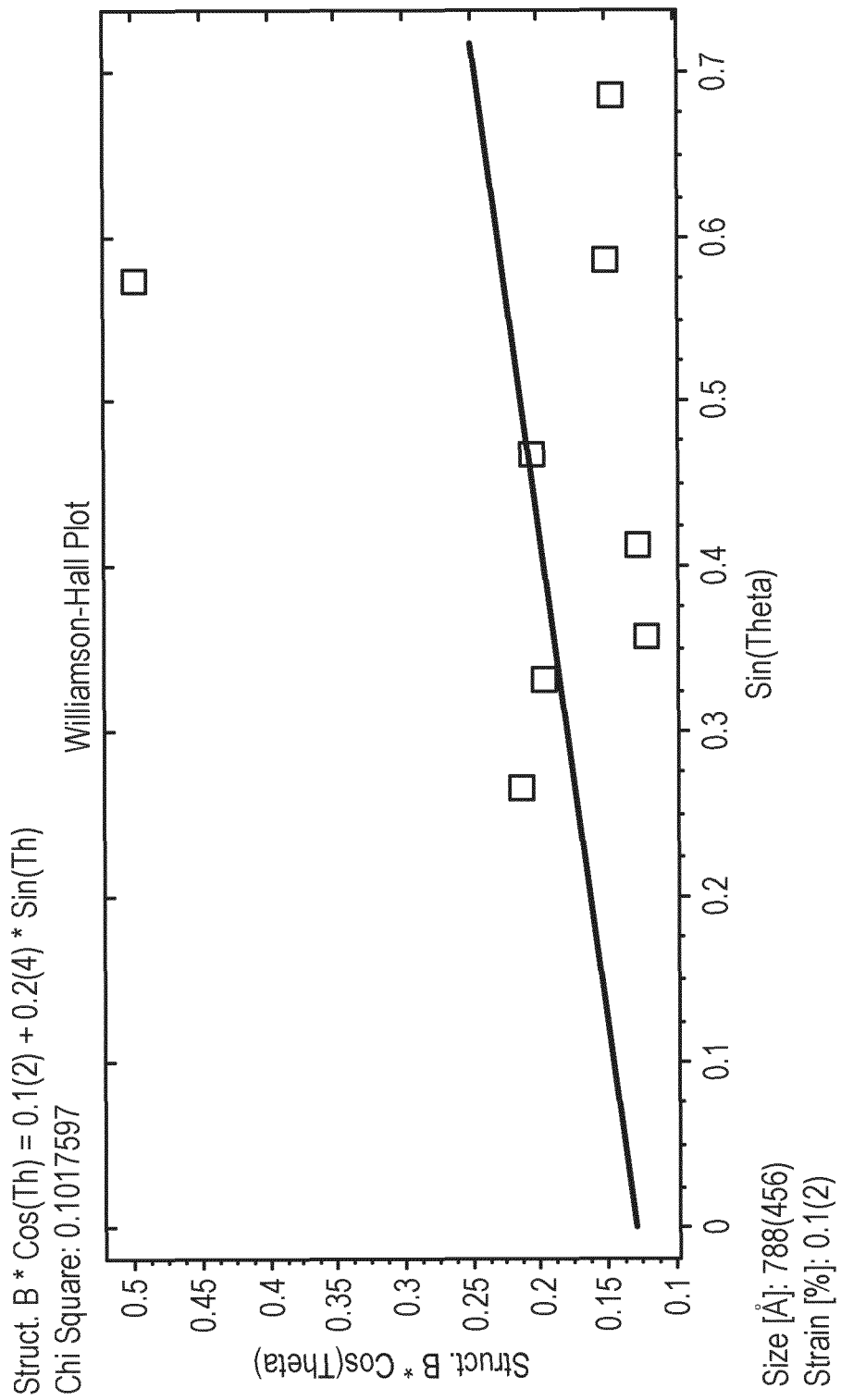

Target titanium carbide powder was prepared from starting materials of $TiO_2$, Graphite and $CaH_2$ granules. Heat treatment was performed at a temperature of 1050° C. for 2 hrs under hydrogen gas protection and cooling for one hour was under argon gas environment for de hydrogenation. SEM micrographs are depicted in FIG. 13. The XRD pattern is shown in FIG. 14.

Scan condition: From 20° to 90°; Step size: 0.01°; Scan step time: 68 s
Phase Analysis:

| No. | Ref. Code | Compound Name | Chemical Formula | Score | Semi Quant [%] |
|---|---|---|---|---|---|
| 1 | 98-060-0226 | Khamrabaevite | C1 Ti1 | 84 | 100 |

Example 5—Preparation of Chromium Carbide Powder

Figure 15A:
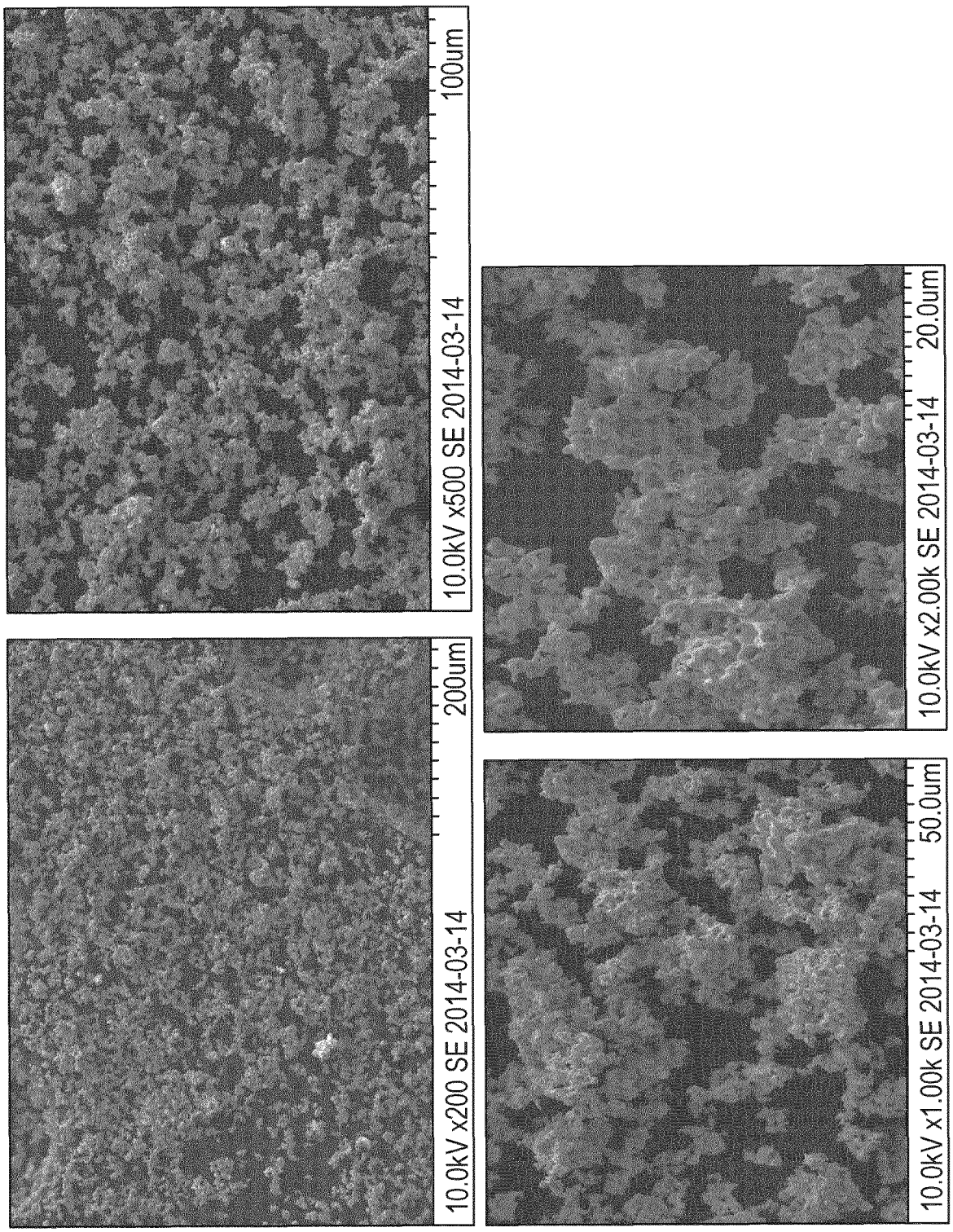
FIGS. 15A and 15B depict SEM micrographs of the chromium carbide powder.
Figure 15B:
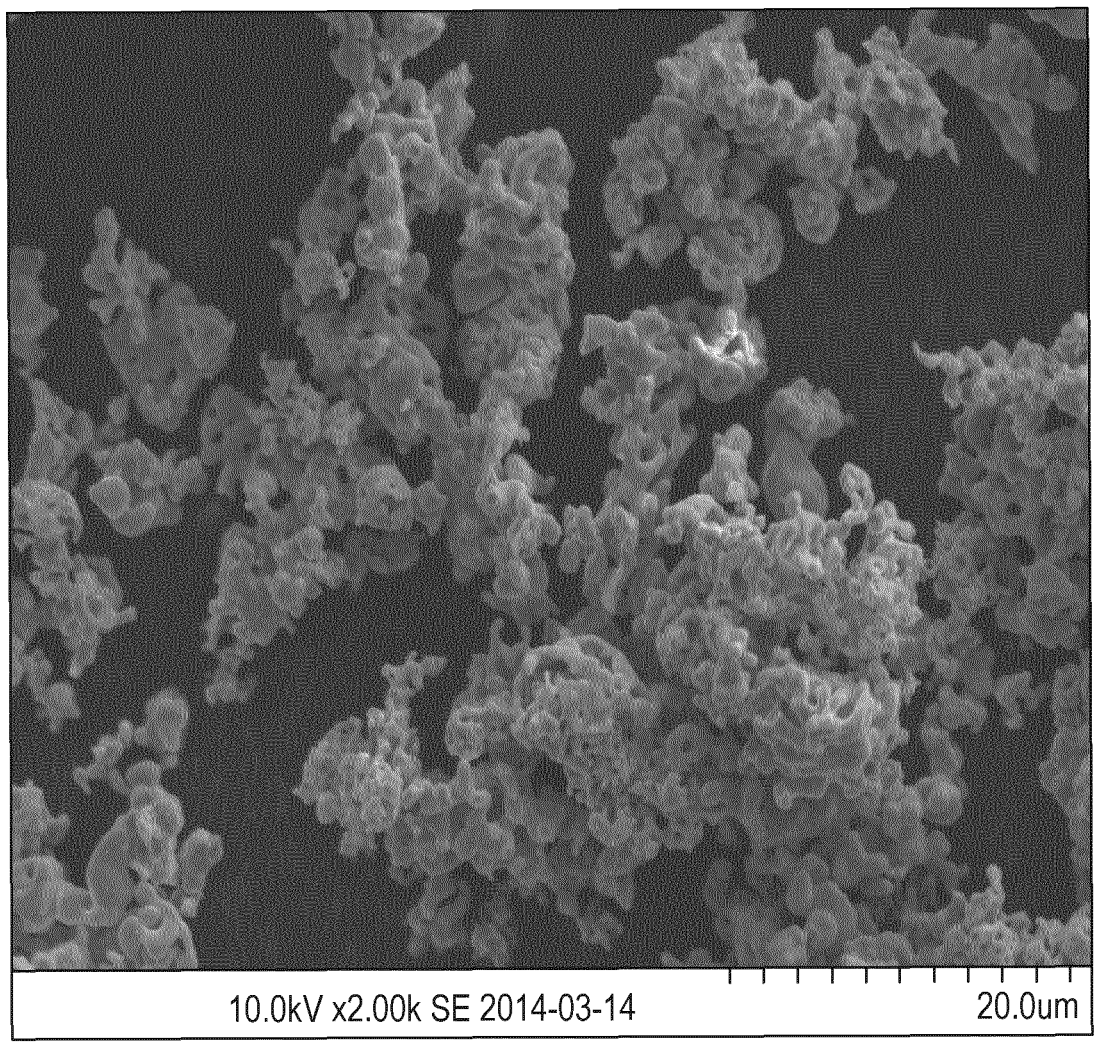
Figure 16A:
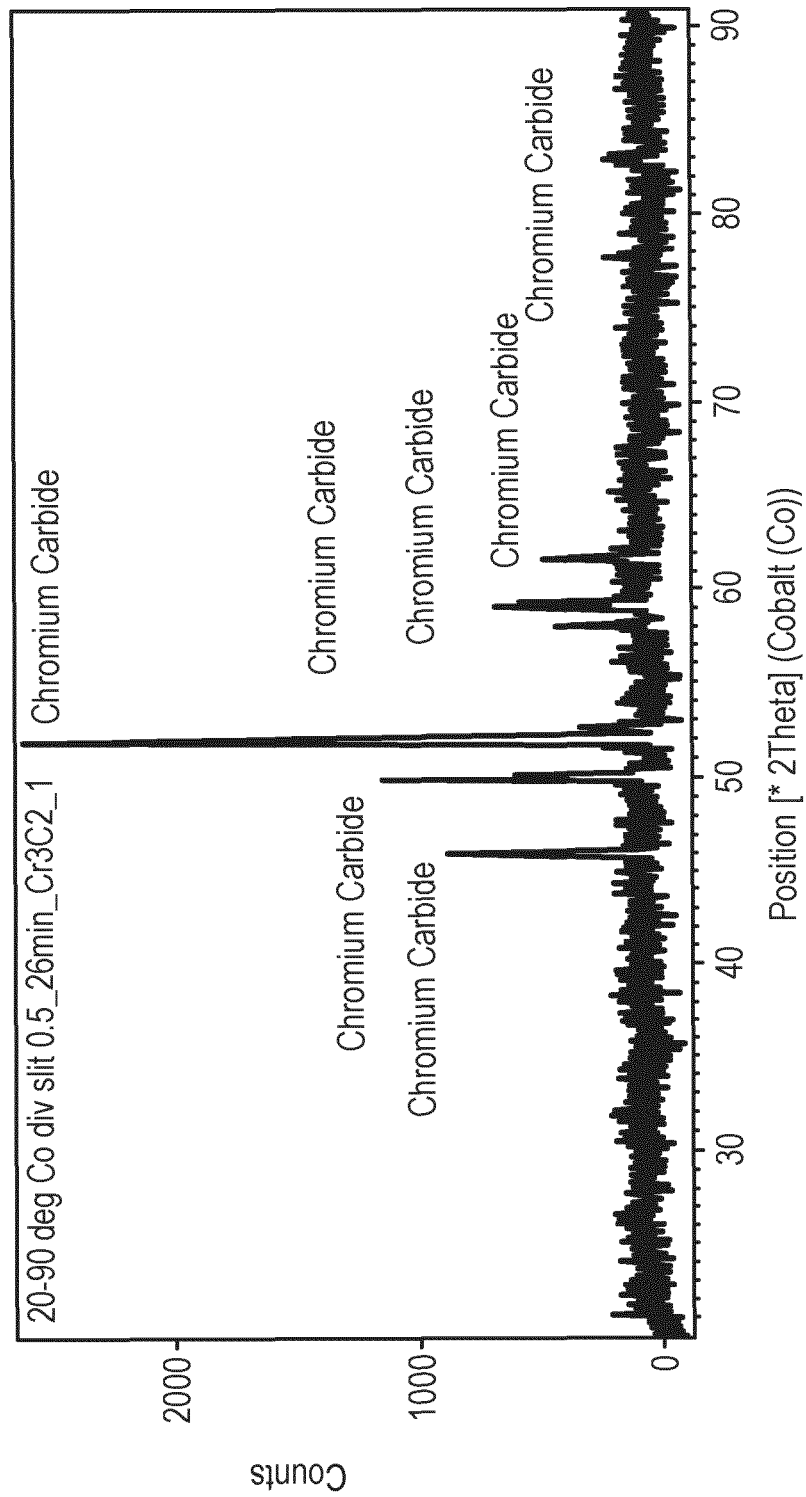
FIGS. 16A and 16B depict the XRD pattern of the chromium carbide final product powder.
Figure 16B:
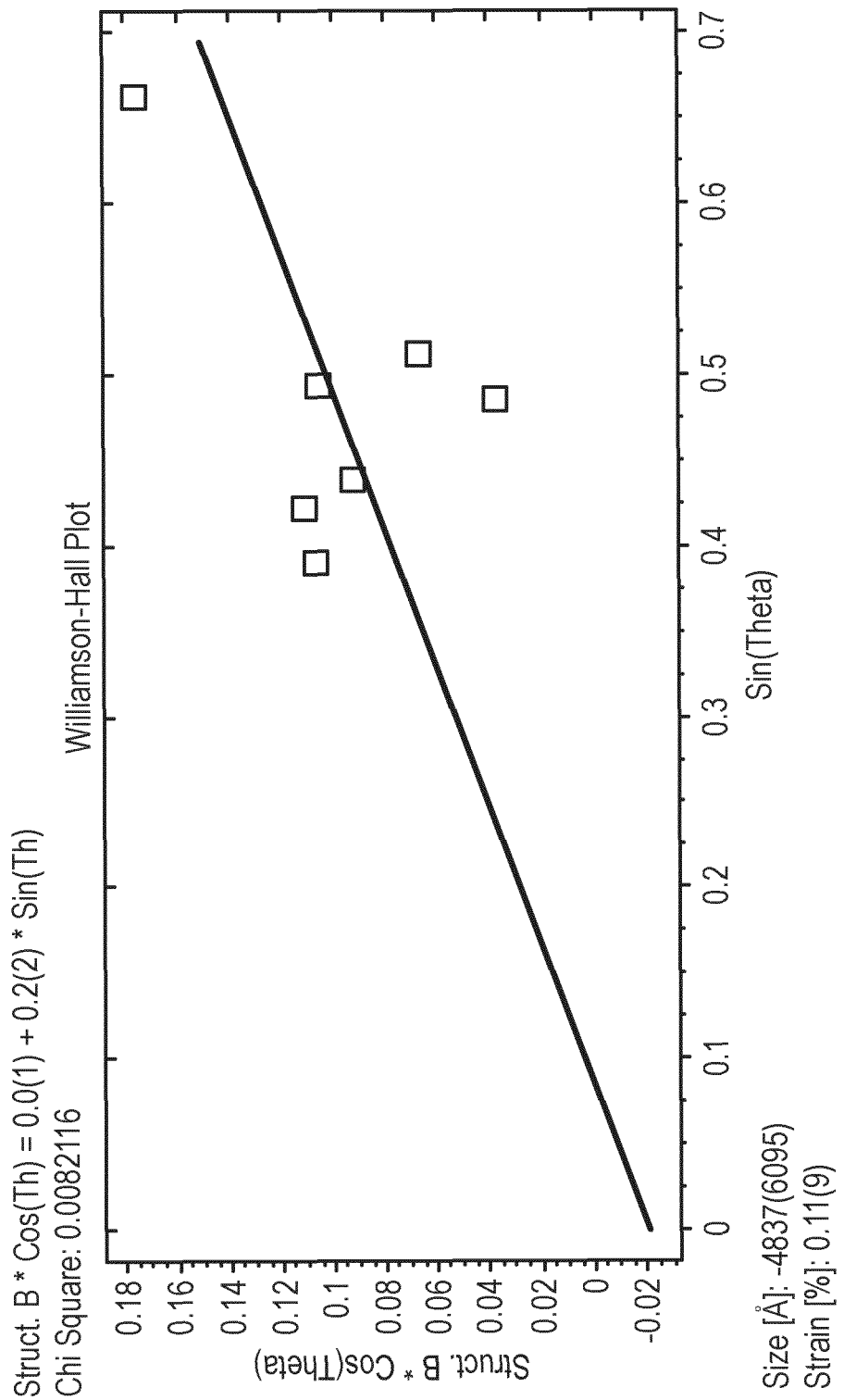

Target Chromium carbide powder was prepared from the starting materials of $Cr_2O_3$, Graphite and $CaH_2$ granules. Heat treatment was performed at a temperature of 1050° C. for 2 hrs under hydrogen gas protection and cooling for one hour was under argon gas environment for de hydrogenation. The SEM micrographs are depicted in FIG. 15. The XRD pattern of the chromium carbide final product powder is depicted in FIG. 16.

Scan condition: From 20° to 90°; Step size: 0.01°; Scan step time: 68 s

The invention claimed is:

1. A process for manufacturing a compound in powder form, wherein said compound is the reaction product of (i) at least one metal and/or metalloid, and (ii) at least one further element that is more electronegative than each said metal and/or metalloid, wherein the process comprises the steps of:
   a. mixing at least one oxide of said at least one metal and/or metalloid with a reducing agent to form a mixture, wherein the reducing agent comprises Ca, Mg, calcium hydride, magnesium hydride or a mixture thereof and is provided in the form of granules or a powder;
   b. contacting the mixture with a source of said at least one further element;
   c. maintaining said mixture under a $H_2$ atmosphere at a temperature of from 950° C. to 1500° C. from 1 to 10 hours; and
   d. recovering said compound in powder form,
   further comprising between steps c and d the steps of:
   c1. switching the $H_2$ atmosphere to an Ar or $N_2$ atmosphere and maintaining the mixture thereunder for a period of at least 1 hour, followed by;
   c2. cooling under Ar or $N_2$ atmosphere,
   wherein said at least one further element is selected from carbon, nitrogen, boron, silicon and mixtures thereof,
   wherein said compound is a metal carbide, nitride, boride, or silicide.

2. The process according to claim 1, wherein said at least one oxide comprises at least one selected from $B_2O_3$, $SiO_2$, $Sc_2O_3$, $TiO_2$, $V_2O_5$, $Cr_2O_3$, $Y_2O_3$, $ZrO_2$, $Nb_2O_5$, $MoO_3$, $HfO_2$, $Ta_2O_5$, and $WO_3$.

3. The process according to claim 1, wherein the or each metal and/or metalloid is selected from Sc, Ti, V, Cr, Y, Zr, Nb, Mo, Hf, Ta, W, B, Si and mixtures thereof, and said at least one further element is selected from carbon, nitrogen, and mixtures thereof.

4. The process according to claim 3, wherein said at least one further element is carbon, said compound in powder form is a carbide of the or each metal and/or metalloid, and said reducing agent comprises Ca, Mg and/or calcium hydride, and wherein in step (c) said mixture is maintained under a $H_2$ atmosphere at a temperature of from 950° C. to 1200° C. for 2-4 hours.

5. The process according to claim 3, wherein said compound in powder form is $B_4C$, SiC, ScC, TiC, VC, $Cr_3C_2$, $Cr_7C_3$, $YC_2$, ZrC, NbC, $Nb_2C$, $Mo_2C$, HfC, TaC, $Ta_2C$, WC, $W_2C$, or a solid mixture of two or more of these carbides.

6. The process according to claim 3, wherein said at least one further element is carbon, and wherein said compound in powder form is niobium carbide, tungsten carbide, or tungsten carbide containing tantalum as a dopant.

7. The process according to claim 1, wherein the reducing agent comprises Ca and/or calcium hydride, and wherein the ratio between the number of oxygen atoms in the oxide of said at least one metal or metalloid and the number of calcium atoms (O:Ca) is in the range of 1:(1.7–1.1).

8. The process according to claim 1, wherein said at least one metal or metalloid is selected from Sc, Ti, V, Cr, Y, Zr, Nb, Mo, Hf, Ta, W and mixtures thereof, and wherein said at least one further element is selected from boron, silicon, and mixtures thereof.

9. The process according to claim 8, wherein said oxide of said at least one metal or metalloid comprises at least one selected from $Sc_2O_3$, $TiO_2$, $V_2O_5$, $Cr_2O_3$, $Y_2O_3$, $ZrO_2$, $Nb_2O_5$, $MoO_3$, $HfO_2$, $Ta_2O_5$, and $WO_3$.

10. The process according to claim 1, wherein the compound in powder form has a content of oxygen of less than 2% by weight.

11. The process according to claim 1, wherein the compound in powder form has an average particle size $X_{50}$ of 100 μm or less.

12. The process according to claim 1, wherein said compound in powder form has a content of oxygen of less than 1% by weight and an average particle size $X_{50}$ of 20 μm or less.

13. The process according to claim 1, wherein maintaining said mixture under a $H_2$ atmosphere at a temperature of from 950° C. to 1500° C. from 1 to 10 hours is in an open furnace.

14. The process according to claim 13, wherein the open furnace is a muffle open furnace.

15. The process according to claim 1, wherein maintaining said mixture under a $H_2$ atmosphere is at a temperature of from 950° C. to 1150° C.

* * * * *